US011528534B2

(12) United States Patent
Bloch et al.

(10) Patent No.: US 11,528,534 B2
(45) Date of Patent: *Dec. 13, 2022

(54) DYNAMIC LIBRARY DISPLAY FOR INTERACTIVE VIDEOS

(71) Applicant: JBF Interlude 2009 LTD, Tel Aviv (IL)

(72) Inventors: Jonathan Bloch, Brooklyn, NY (US); Tal Zubalsky, Brooklyn, NY (US); Yuval Hofshy, Kfar Saba (IL); Barak Feldman, Tenafly, NJ (US)

(73) Assignee: JBF Interlude 2009 LTD, Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,149

(22) Filed: Nov. 6, 2020

(65) Prior Publication Data

US 2021/0306707 A1 Sep. 30, 2021

Related U.S. Application Data

(63) Continuation of application No. 16/283,066, filed on Feb. 22, 2019, now Pat. No. 10,856,049, which is a
(Continued)

(51) Int. Cl.
*H04N 21/472* (2011.01)
*H04N 21/435* (2011.01)
(Continued)

(52) U.S. Cl.
CPC ..... *H04N 21/47202* (2013.01); *H04N 21/435* (2013.01); *H04N 21/44226* (2020.08);
(Continued)

(58) Field of Classification Search
CPC .......... H04N 21/482; H04N 21/44222; H04N 21/47202; H04N 21/812; H04N 21/4312; H04N 21/42204; H04N 21/84
See application file for complete search history.

(56) References Cited

U.S. PATENT DOCUMENTS

| 4,569,026 A | 2/1986 | Best |
| 5,137,277 A | 8/1992 | Kitaue |
(Continued)

FOREIGN PATENT DOCUMENTS

| CA | 2639491 A1 | 3/2010 |
| DE | 004038801 A1 | 6/1992 |
(Continued)

OTHER PUBLICATIONS

U.S. Appl. No. 15/356,913, Systems and Methods for Real-Time Pixel Switching, filed Nov. 21, 2016.
(Continued)

*Primary Examiner* — Jason Salce
(74) *Attorney, Agent, or Firm* — Goodwin Procter LLP

(57) ABSTRACT

A video library interface provides a listing of interactive videos and information associated with the videos and is dynamically updated as a user views the videos and makes decisions that affect the playback of the episodes. More specifically, an interactive video that includes different traversable video paths is provided to and interacted with by a user. Based on user interactions received during presentation of the video, different video paths within the interactive video are traversed. In addition, a video library display including a visual depiction of information associated with a plurality of videos is provided. The video library display is dynamically modified based on one or more interactions made by the user with respect to the interactive video.

20 Claims, 7 Drawing Sheets

US 11,528,534 B2

Page 2

Related U.S. Application Data continuation of application No. 15/863,191, filed on Jan. 5, 2018, now Pat. No. 10,257,578.

(51) Int. Cl.
- H04N 21/482 (2011.01)
- H04N 21/8541 (2011.01)
- H04N 21/475 (2011.01)
- H04N 21/442 (2011.01)

(52) U.S. Cl.
CPC ....... *H04N 21/4758* (2013.01); *H04N 21/482* (2013.01); *H04N 21/8541* (2013.01)

(56) References Cited

U.S. PATENT DOCUMENTS

| | | |
|---|---|---|
| 5,161,034 A | 11/1992 | Klappert |
| 5,568,602 A | 10/1996 | Callahan et al. |
| 5,568,603 A | 10/1996 | Chen et al. |
| 5,597,312 A | 1/1997 | Bloom et al. |
| 5,607,356 A | 3/1997 | Schwartz |
| 5,610,653 A | 3/1997 | Abecassis |
| 5,636,036 A | 6/1997 | Ashbey |
| 5,676,551 A | 10/1997 | Knight et al. |
| 5,694,163 A | 12/1997 | Harrison |
| 5,715,169 A | 2/1998 | Noguchi |
| 5,734,862 A | 3/1998 | Kulas |
| 5,737,527 A | 4/1998 | Shiels et al. |
| 5,745,738 A | 4/1998 | Ricard |
| 5,751,953 A * | 5/1998 | Shiels .................. A63F 13/47 715/720 |
| 5,754,770 A | 5/1998 | Shiels et al. |
| 5,818,435 A | 10/1998 | Kozuka et al. |
| 5,848,934 A | 12/1998 | Shiels et al. |
| 5,887,110 A | 3/1999 | Sakamoto et al. |
| 5,894,320 A | 4/1999 | Vancelette |
| 5,956,037 A | 9/1999 | Osawa et al. |
| 5,966,121 A | 10/1999 | Hubbell et al. |
| 5,983,190 A | 11/1999 | Trower, II et al. |
| 6,067,400 A | 5/2000 | Saeki et al. |
| 6,091,886 A | 7/2000 | Abecassis |
| 6,122,668 A | 9/2000 | Teng et al. |
| 6,128,712 A | 10/2000 | Hunt et al. |
| 6,191,780 B1 | 2/2001 | Martin et al. |
| 6,222,925 B1 | 4/2001 | Shiels et al. |
| 6,240,555 B1 | 5/2001 | Shoff et al. |
| 6,298,020 B1 | 10/2001 | Kumagami |
| 6,298,482 B1 | 10/2001 | Seidman et al. |
| 6,460,036 B1 | 10/2002 | Herz |
| 6,535,639 B1 | 3/2003 | Uchihachi et al. |
| 6,657,906 B2 | 12/2003 | Martin |
| 6,698,020 B1 | 2/2004 | Zigmond et al. |
| 6,728,477 B1 | 4/2004 | Watkins |
| 6,771,875 B1 | 8/2004 | Kunieda et al. |
| 6,801,947 B1 | 10/2004 | Li |
| 6,947,966 B1 | 9/2005 | Oko, Jr. et al. |
| 7,085,844 B2 | 8/2006 | Thompson |
| 7,155,676 B2 | 12/2006 | Land et al. |
| 7,231,132 B1 | 6/2007 | Davenport |
| 7,296,231 B2 | 11/2007 | Loui et al. |
| 7,310,784 B1 | 12/2007 | Gottlieb et al. |
| 7,379,653 B2 | 5/2008 | Yap et al. |
| 7,430,360 B2 | 9/2008 | Abecassis |
| 7,444,069 B1 | 10/2008 | Bernsley |
| 7,472,910 B1 | 1/2009 | Okada et al. |
| 7,627,605 B1 | 12/2009 | Lamere et al. |
| 7,650,623 B2 * | 1/2010 | Hudgeons ................ G09B 7/02 725/136 |
| 7,669,128 B2 | 2/2010 | Bailey et al. |
| 7,694,320 B1 | 4/2010 | Yeo et al. |
| 7,779,438 B2 | 8/2010 | Davies |
| 7,787,973 B2 | 8/2010 | Lambert |
| 7,917,505 B2 | 3/2011 | van Gent et al. |
| 8,024,762 B2 | 9/2011 | Britt |
| 8,046,801 B2 | 10/2011 | Ellis et al. |
| 8,065,710 B2 | 11/2011 | Malik |
| 8,151,139 B1 | 4/2012 | Gordon |
| 8,176,425 B2 | 5/2012 | Wallace et al. |
| 8,190,001 B2 | 5/2012 | Bernsley |
| 8,202,167 B2 | 6/2012 | Ackley et al. |
| 8,276,058 B2 | 9/2012 | Gottlieb et al. |
| 8,281,355 B1 | 10/2012 | Weaver et al. |
| 8,321,905 B1 | 11/2012 | Streeter et al. |
| 8,341,662 B1 * | 12/2012 | Bassett .................. H04N 5/602 725/32 |
| 8,350,908 B2 | 1/2013 | Morris et al. |
| 8,600,220 B2 | 12/2013 | Bloch et al. |
| 8,612,517 B1 | 12/2013 | Yadid et al. |
| 8,626,337 B2 | 1/2014 | Corak et al. |
| 8,646,020 B2 | 2/2014 | Reisman |
| 8,650,489 B1 | 2/2014 | Baum et al. |
| 8,667,395 B2 | 3/2014 | Hosogai et al. |
| 8,750,682 B1 | 6/2014 | Nicksay et al. |
| 8,752,087 B2 | 6/2014 | Begeja et al. |
| 8,826,337 B2 | 9/2014 | Issa et al. |
| 8,860,882 B2 | 10/2014 | Bloch et al. |
| 8,930,975 B2 | 1/2015 | Woods et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,082,092 B1 | 7/2015 | Henry |
| 9,094,718 B2 | 7/2015 | Barton et al. |
| 9,190,110 B2 | 11/2015 | Bloch |
| 9,257,148 B2 | 2/2016 | Bloch et al. |
| 9,268,774 B2 | 2/2016 | Kim et al. |
| 9,271,015 B2 | 2/2016 | Bloch et al. |
| 9,363,464 B2 | 6/2016 | Alexander |
| 9,367,196 B1 | 6/2016 | Goldstein et al. |
| 9,374,411 B1 | 6/2016 | Goetz |
| 9,390,099 B1 | 7/2016 | Wang et al. |
| 9,456,247 B1 | 9/2016 | Pontual et al. |
| 9,465,435 B1 | 10/2016 | Zhang et al. |
| 9,473,582 B1 | 10/2016 | Fraccaroli |
| 9,510,044 B1 | 11/2016 | Pereira et al. |
| 9,520,155 B2 | 12/2016 | Bloch et al. |
| 9,530,454 B2 | 12/2016 | Bloch et al. |
| 9,531,998 B1 | 12/2016 | Farrell et al. |
| 9,538,219 B2 | 1/2017 | Sakata et al. |
| 9,554,061 B1 | 1/2017 | Proctor, Jr. et al. |
| 9,571,877 B2 | 2/2017 | Lee et al. |
| 9,607,655 B2 | 3/2017 | Bloch et al. |
| 9,641,898 B2 | 5/2017 | Bloch et al. |
| 9,653,115 B2 | 5/2017 | Bloch et al. |
| 9,653,116 B2 | 5/2017 | Paulraj et al. |
| 9,672,868 B2 | 6/2017 | Bloch et al. |
| 9,715,901 B1 | 7/2017 | Singh et al. |
| 9,736,503 B1 | 8/2017 | Bakshi et al. |
| 9,792,026 B2 | 10/2017 | Bloch et al. |
| 9,792,957 B2 | 10/2017 | Bloch et al. |
| 9,826,285 B1 | 11/2017 | Mishra et al. |
| 9,967,621 B2 | 5/2018 | Armstrong et al. |
| 10,070,192 B2 | 9/2018 | Baratz |
| 10,178,304 B1 | 1/2019 | Tudor et al. |
| 10,178,421 B2 | 1/2019 | Thomas et al. |
| 10,187,687 B2 | 1/2019 | Harb et al. |
| 10,194,189 B1 | 1/2019 | Goetz et al. |
| 10,257,572 B2 | 4/2019 | Manus et al. |
| 10,257,578 B1 * | 4/2019 | Bloch .................. H04N 21/8541 |
| 10,310,697 B2 * | 6/2019 | Roberts .............. H04N 21/4722 |
| 10,419,790 B2 | 9/2019 | Gersten |
| 10,460,765 B2 | 10/2019 | Bloch et al. |
| 10,523,982 B2 | 12/2019 | Oyman |
| 10,771,824 B1 | 9/2020 | Haritaoglu et al. |
| 10,856,049 B2 * | 12/2020 | Bloch ................ H04N 21/4758 |
| 11,003,748 B2 | 5/2021 | Oliker et al. |
| 2001/0056427 A1 | 12/2001 | Yoon et al. |
| 2002/0019799 A1 | 2/2002 | Ginsberg et al. |
| 2002/0029218 A1 | 3/2002 | Bentley et al. |
| 2002/0053089 A1 | 5/2002 | Massey |
| 2002/0086724 A1 | 7/2002 | Miyaki et al. |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |

(56) References Cited

U.S. PATENT DOCUMENTS

| | | | |
|---|---|---|---|
| 2002/0120931 A1* | 8/2002 | Huber | H04N 21/25891 |
| | | | 725/34 |
| 2002/0124250 A1 | 9/2002 | Proehl et al. | |
| 2002/0129374 A1 | 9/2002 | Freeman et al. | |
| 2002/0140719 A1 | 10/2002 | Amir et al. | |
| 2002/0144262 A1 | 10/2002 | Plotnick et al. | |
| 2002/0174430 A1 | 11/2002 | Ellis et al. | |
| 2002/0177914 A1 | 11/2002 | Chase | |
| 2002/0194595 A1 | 12/2002 | Miller et al. | |
| 2003/0007560 A1 | 1/2003 | Mayhew et al. | |
| 2003/0012409 A1 | 1/2003 | Overton et al. | |
| 2003/0020744 A1 | 1/2003 | Ellis et al. | |
| 2003/0023757 A1 | 1/2003 | Ishioka et al. | |
| 2003/0039471 A1 | 2/2003 | Hashimoto | |
| 2003/0069057 A1 | 4/2003 | DeFrees-Parrott | |
| 2003/0076347 A1 | 4/2003 | Barrett et al. | |
| 2003/0101164 A1 | 5/2003 | Pic et al. | |
| 2003/0148806 A1 | 8/2003 | Weiss | |
| 2003/0159566 A1 | 8/2003 | Sater et al. | |
| 2003/0183064 A1 | 10/2003 | Eugene et al. | |
| 2003/0184598 A1 | 10/2003 | Graham | |
| 2003/0221541 A1 | 12/2003 | Platt | |
| 2004/0009813 A1 | 1/2004 | Wind | |
| 2004/0019905 A1 | 1/2004 | Fellenstein et al. | |
| 2004/0034711 A1 | 2/2004 | Hughes | |
| 2004/0070595 A1 | 4/2004 | Atlas et al. | |
| 2004/0091848 A1 | 5/2004 | Nemitz | |
| 2004/0125124 A1 | 7/2004 | Kim et al. | |
| 2004/0128317 A1 | 7/2004 | Sull et al. | |
| 2004/0138948 A1 | 7/2004 | Loomis | |
| 2004/0146275 A1 | 7/2004 | Takata et al. | |
| 2004/0172476 A1 | 9/2004 | Chapweske | |
| 2004/0194128 A1 | 9/2004 | McIntyre et al. | |
| 2004/0194131 A1 | 9/2004 | Ellis et al. | |
| 2004/0199923 A1 | 10/2004 | Russek | |
| 2004/0261127 A1 | 12/2004 | Freeman et al. | |
| 2005/0019015 A1 | 1/2005 | Ackley et al. | |
| 2005/0028193 A1 | 2/2005 | Candelore et al. | |
| 2005/0055377 A1 | 3/2005 | Dorey et al. | |
| 2005/0091597 A1 | 4/2005 | Ackley | |
| 2005/0102707 A1 | 5/2005 | Schnitman | |
| 2005/0107159 A1 | 5/2005 | Sato | |
| 2005/0120389 A1 | 6/2005 | Boss et al. | |
| 2005/0132401 A1 | 6/2005 | Boccon-Gibod et al. | |
| 2005/0166224 A1 | 7/2005 | Ficco | |
| 2005/0198661 A1 | 9/2005 | Collins et al. | |
| 2005/0210145 A1 | 9/2005 | Kim et al. | |
| 2005/0240955 A1* | 10/2005 | Hudson | H04N 21/854 |
| | | | 725/9 |
| 2005/0251820 A1 | 11/2005 | Stefanik et al. | |
| 2005/0251827 A1 | 11/2005 | Ellis et al. | |
| 2005/0289582 A1 | 12/2005 | Tavares et al. | |
| 2006/0002895 A1 | 1/2006 | McDonnell et al. | |
| 2006/0024034 A1 | 2/2006 | Filo et al. | |
| 2006/0028951 A1 | 2/2006 | Tozun et al. | |
| 2006/0064733 A1 | 3/2006 | Norton et al. | |
| 2006/0080167 A1 | 4/2006 | Chen et al. | |
| 2006/0120624 A1 | 6/2006 | Jojic et al. | |
| 2006/0130121 A1 | 6/2006 | Candelore et al. | |
| 2006/0150072 A1 | 7/2006 | Salvucci | |
| 2006/0150216 A1 | 7/2006 | Herz et al. | |
| 2006/0153537 A1 | 7/2006 | Kaneko et al. | |
| 2006/0155400 A1 | 7/2006 | Loomis | |
| 2006/0200842 A1 | 9/2006 | Chapman et al. | |
| 2006/0212904 A1 | 9/2006 | Klarfeld et al. | |
| 2006/0222322 A1 | 10/2006 | Levitan | |
| 2006/0224260 A1 | 10/2006 | Hicken et al. | |
| 2006/0253330 A1 | 11/2006 | Maggio et al. | |
| 2006/0274828 A1 | 12/2006 | Siemens et al. | |
| 2007/0003149 A1 | 1/2007 | Nagumo et al. | |
| 2007/0024706 A1 | 2/2007 | Brannon et al. | |
| 2007/0028272 A1* | 2/2007 | Lockton | H04N 21/4758 |
| | | | 725/62 |
| 2007/0033633 A1 | 2/2007 | Andrews et al. | |
| 2007/0055989 A1 | 3/2007 | Shanks et al. | |
| 2007/0079325 A1 | 4/2007 | de Heer | |
| 2007/0085759 A1 | 4/2007 | Lee et al. | |
| 2007/0099684 A1 | 5/2007 | Butterworth | |
| 2007/0101369 A1 | 5/2007 | Dolph | |
| 2007/0118801 A1 | 5/2007 | Harshbarger et al. | |
| 2007/0154169 A1 | 7/2007 | Cordray et al. | |
| 2007/0157234 A1 | 7/2007 | Walker | |
| 2007/0157260 A1 | 7/2007 | Walker | |
| 2007/0157261 A1 | 7/2007 | Steelberg et al. | |
| 2007/0162395 A1 | 7/2007 | Ben-Yaacov et al. | |
| 2007/0180488 A1* | 8/2007 | Walter | H04N 21/8586 |
| | | | 725/135 |
| 2007/0220583 A1 | 9/2007 | Bailey et al. | |
| 2007/0226761 A1 | 9/2007 | Zalewski et al. | |
| 2007/0239754 A1 | 10/2007 | Schnitman | |
| 2007/0253677 A1 | 11/2007 | Wang | |
| 2007/0253688 A1 | 11/2007 | Koennecke | |
| 2007/0263722 A1 | 11/2007 | Fukuzawa | |
| 2008/0019445 A1 | 1/2008 | Aono et al. | |
| 2008/0021187 A1 | 1/2008 | Wescott et al. | |
| 2008/0021874 A1 | 1/2008 | Dahl et al. | |
| 2008/0022320 A1 | 1/2008 | Ver Steeg | |
| 2008/0031595 A1 | 2/2008 | Cho | |
| 2008/0086456 A1 | 4/2008 | Rasanen et al. | |
| 2008/0086754 A1 | 4/2008 | Chen et al. | |
| 2008/0091721 A1 | 4/2008 | Harboe et al. | |
| 2008/0092159 A1 | 4/2008 | Dmitriev et al. | |
| 2008/0148152 A1 | 6/2008 | Blinnikka et al. | |
| 2008/0161111 A1 | 7/2008 | Schuman | |
| 2008/0170687 A1 | 7/2008 | Moors et al. | |
| 2008/0177893 A1 | 7/2008 | Bowra et al. | |
| 2008/0178232 A1 | 7/2008 | Velusamy | |
| 2008/0276157 A1 | 11/2008 | Kustka et al. | |
| 2008/0300967 A1 | 12/2008 | Buckley et al. | |
| 2008/0301750 A1 | 12/2008 | Silfvast et al. | |
| 2008/0314232 A1 | 12/2008 | Hansson et al. | |
| 2009/0022015 A1 | 1/2009 | Harrison | |
| 2009/0022165 A1 | 1/2009 | Candelore et al. | |
| 2009/0024923 A1 | 1/2009 | Hartwig et al. | |
| 2009/0027337 A1 | 1/2009 | Hildreth | |
| 2009/0029771 A1 | 1/2009 | Donahue | |
| 2009/0055880 A1 | 2/2009 | Batteram et al. | |
| 2009/0063681 A1 | 3/2009 | Ramakrishnan et al. | |
| 2009/0063995 A1 | 3/2009 | Baron et al. | |
| 2009/0077137 A1 | 3/2009 | Weda et al. | |
| 2009/0079663 A1 | 3/2009 | Chang et al. | |
| 2009/0083631 A1 | 3/2009 | Sidi et al. | |
| 2009/0116817 A1 | 5/2009 | Kim et al. | |
| 2009/0131764 A1 | 5/2009 | Lee et al. | |
| 2009/0133051 A1 | 5/2009 | Hildreth | |
| 2009/0133071 A1 | 5/2009 | Sakai et al. | |
| 2009/0138805 A1 | 5/2009 | Hildreth | |
| 2009/0177538 A1 | 7/2009 | Brewer et al. | |
| 2009/0178089 A1 | 7/2009 | Picco et al. | |
| 2009/0191971 A1 | 7/2009 | Avent | |
| 2009/0195652 A1 | 8/2009 | Gal | |
| 2009/0199697 A1 | 8/2009 | Lehtiniemi et al. | |
| 2009/0210790 A1 | 8/2009 | Thomas | |
| 2009/0226046 A1 | 9/2009 | Shteyn | |
| 2009/0228572 A1 | 9/2009 | Wall et al. | |
| 2009/0254827 A1 | 10/2009 | Gonze et al. | |
| 2009/0258708 A1 | 10/2009 | Figueroa | |
| 2009/0265737 A1 | 10/2009 | Issa et al. | |
| 2009/0265746 A1 | 10/2009 | Halen et al. | |
| 2009/0297118 A1 | 12/2009 | Fink et al. | |
| 2009/0320075 A1 | 12/2009 | Marko | |
| 2010/0017820 A1 | 1/2010 | Thevathasan et al. | |
| 2010/0042496 A1 | 2/2010 | Wang et al. | |
| 2010/0050083 A1 | 2/2010 | Axen et al. | |
| 2010/0069159 A1 | 3/2010 | Yamada et al. | |
| 2010/0070987 A1 | 3/2010 | Amento et al. | |
| 2010/0077290 A1 | 3/2010 | Pueyo | |
| 2010/0088726 A1 | 4/2010 | Curtis et al. | |
| 2010/0122286 A1 | 5/2010 | Begeja et al. | |
| 2010/0146145 A1 | 6/2010 | Tippin et al. | |
| 2010/0153512 A1 | 6/2010 | Balassanian et al. | |
| 2010/0153885 A1 | 6/2010 | Yates | |
| 2010/0161792 A1 | 6/2010 | Palm et al. | |
| 2010/0162344 A1 | 6/2010 | Casagrande et al. | |

(56) References Cited

U.S. PATENT DOCUMENTS

| | | |
|---|---|---|
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0312670 A1 | 12/2010 | Dempsey |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0011438 A1 | 1/2012 | Kim et al. |
| 2012/0017141 A1 | 1/2012 | Eelen et al. |
| 2012/0062576 A1 | 3/2012 | Rosenthal et al. |
| 2012/0072420 A1 | 3/2012 | Moganti et al. |
| 2012/0081389 A1 | 4/2012 | Dilts |
| 2012/0089911 A1 | 4/2012 | Hosking et al. |
| 2012/0090000 A1 | 4/2012 | Cohen et al. |
| 2012/0094768 A1* | 4/2012 | McCaddon ............ G06F 3/0482 463/42 |
| 2012/0105723 A1 | 5/2012 | van Coppenolle et al. |
| 2012/0110618 A1 | 5/2012 | Kilar et al. |
| 2012/0110620 A1 | 5/2012 | Kilar et al. |
| 2012/0120114 A1 | 5/2012 | You et al. |
| 2012/0134646 A1 | 5/2012 | Alexander |
| 2012/0137015 A1 | 5/2012 | Sun |
| 2012/0147954 A1 | 6/2012 | Kasai et al. |
| 2012/0159530 A1 | 6/2012 | Ahrens et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0198489 A1 | 8/2012 | O'Connell et al. |
| 2012/0213495 A1 | 8/2012 | Hafeneger et al. |
| 2012/0225693 A1 | 9/2012 | Sirpal et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1 | 4/2013 | Stone et al. |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0167168 A1 | 6/2013 | Ellis et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0195427 A1 | 8/2013 | Sathish |
| 2013/0202265 A1 | 8/2013 | Arrasvuori et al. |
| 2013/0204710 A1 | 8/2013 | Boland et al. |
| 2013/0205314 A1 | 8/2013 | Ramaswamy et al. |
| 2013/0219425 A1 | 8/2013 | Swartz |
| 2013/0235152 A1 | 9/2013 | Hannuksela et al. |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0282917 A1 | 10/2013 | Reznik et al. |
| 2013/0283401 A1 | 10/2013 | Pabla et al. |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1 | 4/2014 | Lee |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |

(56) References Cited

U.S. PATENT DOCUMENTS

| | | |
|---|---|---|
| 2014/0314239 A1 | 10/2014 | Meyer et al. |
| 2014/0317638 A1 | 10/2014 | Hayes |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0020086 A1 | 1/2015 | Chen et al. |
| 2015/0033266 A1 | 1/2015 | Klappert et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |
| 2015/0067723 A1 | 3/2015 | Bloch et al. |
| 2015/0070458 A1 | 3/2015 | Kim et al. |
| 2015/0070516 A1 | 3/2015 | Shoemake et al. |
| 2015/0104155 A1 | 4/2015 | Bloch et al. |
| 2015/0106845 A1 | 4/2015 | Popkiewicz et al. |
| 2015/0124171 A1 | 5/2015 | King |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181291 A1 | 6/2015 | Wheatley |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0256861 A1 | 9/2015 | Oyman |
| 2015/0258454 A1 | 9/2015 | King et al. |
| 2015/0286716 A1 | 10/2015 | Snibbe et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0318018 A1 | 11/2015 | Kaiser et al. |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2015/0373385 A1 | 12/2015 | Straub |
| 2016/0009487 A1 | 1/2016 | Edwards et al. |
| 2016/0021412 A1 | 1/2016 | Zito, Jr. |
| 2016/0029002 A1 | 1/2016 | Balko |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0086585 A1 | 3/2016 | Sugimoto |
| 2016/0094875 A1 | 3/2016 | Peterson et al. |
| 2016/0099024 A1 | 4/2016 | Gilley |
| 2016/0100226 A1 | 4/2016 | Sadler et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0134946 A1* | 5/2016 | Glover ............ H04N 21/44204 725/34 |
| 2016/0142889 A1 | 5/2016 | O'Connor et al. |
| 2016/0150278 A1 | 5/2016 | Greene |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0232579 A1 | 8/2016 | Fahnestock |
| 2016/0277779 A1 | 9/2016 | Zhang et al. |
| 2016/0303608 A1 | 10/2016 | Jossick |
| 2016/0321689 A1 | 11/2016 | Turgeman |
| 2016/0322054 A1 | 11/2016 | Bloch et al. |
| 2016/0323608 A1 | 11/2016 | Bloch et al. |
| 2016/0337691 A1 | 11/2016 | Prasad et al. |
| 2016/0344873 A1 | 11/2016 | Jenzeh et al. |
| 2016/0365117 A1 | 12/2016 | Boliek et al. |
| 2016/0366454 A1 | 12/2016 | Tatourian et al. |
| 2017/0006322 A1 | 1/2017 | Dury et al. |
| 2017/0041372 A1 | 2/2017 | Hosur |
| 2017/0062012 A1 | 3/2017 | Bloch et al. |
| 2017/0142486 A1 | 5/2017 | Masuda |
| 2017/0149795 A1 | 5/2017 | Day, II |
| 2017/0178409 A1 | 6/2017 | Bloch et al. |
| 2017/0178601 A1 | 6/2017 | Bloch et al. |
| 2017/0195736 A1 | 7/2017 | Chai et al. |
| 2017/0264920 A1 | 9/2017 | Mickelsen |
| 2017/0286424 A1 | 10/2017 | Peterson |
| 2017/0289220 A1 | 10/2017 | Bloch et al. |
| 2017/0295410 A1 | 10/2017 | Bloch et al. |
| 2017/0326462 A1 | 11/2017 | Lyons et al. |
| 2017/0337196 A1 | 11/2017 | Goela et al. |
| 2017/0345460 A1 | 11/2017 | Bloch et al. |
| 2018/0007443 A1 | 1/2018 | Cannistraro et al. |
| 2018/0014049 A1 | 1/2018 | Griffin et al. |
| 2018/0025078 A1 | 1/2018 | Quennesson |
| 2018/0048831 A1 | 2/2018 | Berwick et al. |
| 2018/0060430 A1 | 3/2018 | Lu |
| 2018/0068019 A1 | 3/2018 | Novikoff et al. |
| 2018/0115592 A1 | 4/2018 | Samineni |
| 2018/0130501 A1 | 5/2018 | Bloch et al. |
| 2018/0176573 A1 | 6/2018 | Chawla et al. |
| 2018/0191574 A1 | 7/2018 | Vishnia et al. |
| 2018/0254067 A1 | 9/2018 | Elder |
| 2018/0262798 A1 | 9/2018 | Ramachan Dra |
| 2018/0310049 A1 | 10/2018 | Takahashi et al. |
| 2018/0314959 A1 | 11/2018 | Apokatanidis et al. |
| 2018/0376205 A1 | 12/2018 | Oswal et al. |
| 2019/0066188 A1 | 2/2019 | Rothschild |
| 2019/0069038 A1 | 2/2019 | Phillips |
| 2019/0069039 A1 | 2/2019 | Phillips |
| 2019/0075367 A1 | 3/2019 | van Zessen et al. |
| 2019/0090002 A1 | 3/2019 | Ramadorai et al. |
| 2019/0098371 A1 | 3/2019 | Keesan |
| 2019/0132639 A1 | 5/2019 | Panchaksharaiah et al. |
| 2019/0166412 A1 | 5/2019 | Panchaksharaiah et al. |
| 2019/0182525 A1 | 6/2019 | Steinberg et al. |
| 2019/0238719 A1 | 8/2019 | Alameh et al. |
| 2019/0335225 A1 | 10/2019 | Fang et al. |
| 2019/0354936 A1 | 11/2019 | Deluca et al. |
| 2020/0023157 A1 | 1/2020 | Lewis et al. |
| 2020/0037047 A1 | 1/2020 | Cheung et al. |
| 2020/0169787 A1 | 5/2020 | Pearce et al. |
| 2020/0193163 A1 | 6/2020 | Chang et al. |
| 2020/0344508 A1 | 10/2020 | Edwards et al. |

FOREIGN PATENT DOCUMENTS

| | | |
|---|---|---|
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2003-245471 A | 9/2003 |
| JP | 2008005288 A | 1/2008 |
| KR | 2004-0005068 A | 1/2004 |
| KR | 2010-0037413 A | 4/2010 |
| WO | WO-1996/013810 A1 | 5/1996 |
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009/125404 A2 | 10/2009 |
| WO | WO-2009/137919 A1 | 11/2009 |

OTHER PUBLICATIONS

U.S. Appl. No. 15/481,916 Published as US 2017-0345460, Systems and Methods for Creating Linear Video From Branched Video, filed Apr. 7, 2017.
U.S. Appl. No. 14/534,626 Published as US-2018-0130501-A1, Systems and Methods for Dynamic Video Bookmarking, filed Sep. 13, 2017.

(56) References Cited

OTHER PUBLICATIONS

U.S. Appl. No. 16/865,896, Systems and Methods for Dynamic Video Bookmarking, filed May 4, 2020.
U.S. Appl. No. 16/752,193, Systems and Methods for Nonlinear Video Playback Using Linear Real-Time Video Players, filed Jan. 24, 2020.
U.S. Appl. No. 16/800,994, Systems and Methods for Adaptive and Responsive Video, filed Feb. 25, 2020.
U.S. Appl. No. 14/978,464 Published as US2017/0178601, Intelligent Buffering of Large-Scale Video, filed Dec. 22, 2015.
U.S. Appl. No. 14/978,491, Published as US2017/0178409, Seamless Transitions in Large-Scale Video, filed Dec. 22, 2015.
U.S. Appl. No. 15/395,477 Published as US2018/0191574, Systems and Methods for Dynamic Weighting of Branched Video Paths, filed Dec. 30, 2016.
U.S. Appl. No. 16/591,103, Systems and Methods for Dynamically Adjusting Video Aspect Ratios, filed Oct. 2, 2019.
U.S. Appl. No. 16/793,205, Dynamic Adaptation of Interactive Video Players Using Behavioral Analytics, filed Feb. 18, 2020.
U.S. Appl. No. 16/793,201, Systems and Methods for Detecting Anomalous Activities for Interactive Videos, filed Feb. 18, 2020.
U.S. Appl. No. 16/922,540, Systems and Methods for Seamless Audio and Video Endpoint Transitions, filed Jul. 7, 2020.
U.S. Appl. No. 12/706,721, now U.S. Pat. No. 9,190,110, the Office Actions dated Apr. 26, 2012, Aug. 17, 2012, Mar. 28, 2013, Jun. 20, 2013, Jan. 3, 2014, Jul. 7, 2014, and Dec. 19, 2014; the Notices of Allowance dated Jun. 19, 2015, Jul. 17, 2015, Jul. 29, 2015, Aug. 12, 2015, and Sep. 14, 2015.
U.S Appl. No. 14/884,284, the Office Actions dated Sep. 8, 2017; May 18, 2018; Dec. 14, 2018; Jul. 25, 2019; Nov. 18, 2019 and Feb. 21, 2020.
U.S. Appl. No. 13/033,916, now U.S. Pat. No. 9,607,655, the Office Actions dated Jun. 7, 2013, Jan. 2, 2014, Aug. 28, 2014, Jan. 5, 2015, Jul. 9, 2015, and Jan. 5, 2016; the Advisory Action dated May 11, 2016; and the Notice of Allowance dated Dec. 21, 2016.
U.S. Appl. No. 13/034,645, the Office Actions dated Jul. 23, 2012, Mar. 21, 2013, Sep. 15, 2014, Jun. 4, 2015, Apr. 7, 2017, Oct. 6, 2017, Aug. 10, 2018, Jul. 5, 2016, Apr. 5, 2019 and Dec. 26, 2019.
U.S. Appl. No. 13/437,164, now U.S. Pat. No. 8,600,220, the Notice of Allowance dated Aug. 9, 2013.
U.S. Appl. No. 14/069,694, now U.S. Pat. No.9,271,015, the Office Actions dated Apr. 27, 2015 and Aug. 31, 2015, the Notice of Allwance dated Oct. 13, 2015.
U.S. Appl. No. 13/622,780, now U.S. Pat. No. 8,860,882, the Offce Acion dated Jan. 16, 2014, the Notice of Allowance dated Aug. 4, 2014.
U.S. Appl. No. 13/622,795, now U.S. Pat. No. 9,009,619, the Office Actions dated May 23, 2014 and Dec. 1, 2014, the Notice of Allowance dated Jan. 9, 2015.
U.S. Appl. No. 14/639,579, now U.S. Pat. No. 10,474,334, the Office Actions dated May 3, 2017, Nov. 22, 2017, and Jun. 26, 2018, the Notices of Allowances dated Feb. 8, 2019 and Jul. 11, 2019.
U.S. Appl. No. 13/838,830, now U.S. Pat. No. 9,257,148, the Office Action dated May 7, 2015, Notices of Allowance dated Nov. 6, 2015.
U.S. Appl. No. 14/984,821, now U.S. Pat. No. 10,418,066, the Office Actions dated Jun. 1, 2017, Dec. 6, 2017, and Oct. 5, 2018; the Notice of Allowance dated May 7, 2019.
U.S. Appl. No. 13/921,536, now U.S. Pat. No. 9,832,516, the Office Actions dated Feb. 25, 2015, Oct. 20, 2015, Aug. 26, 2016 and Mar. 8, 2017, the Advisory Action dated Jun. 21, 2017, and Notice of Allowance dated Sep. 12, 2017.
U.S. Appl. No. 14/107,600, now U.S. Pat. No. 10,448,119, the Office Actions dated Dec. 19, 2014, Jul. 8, 2015, Jun. 3, 2016, Mar. 8, 2017, Oct. 10, 2017 and Jul. 25, 2018, and the Notices of Allowance dated Dec. 31, 2018 and Apr. 25, 2019.
U.S. Appl. No. 14/335,381, now U.S. Pat. No. 9,530,454, the Office Action dated Feb. 12, 2016; and the Notice of Allowance dated Aug. 25, 2016.
U.S. Appl. No. 14/139,996, now U.S. Pat. No. 9,641,898, the Office Actions dated Jun. 18, 2015, Feb. 3, 2016 and May 4, 2016; and the Notice of Allowance dated Dec. 23, 2016.
U.S. Appl. No. 14/140,007, now U.S. Pat. No. 9,520,155, the Office Actions dated Sep. 8, 2015 and Apr. 26, 2016; and the Notice of Allowance dated Oct. 11, 2016.
U.S. Appl. No. 14/249,627, now U.S. Pat. No. 9,653,115, the Office Actions dated Jan. 14, 2016 and Aug. 9, 2016; and the Notice of Allowance dated Jan. 13, 2017.
U.S. Appl. No. 15/481,916, the Office Actions dated Oct. 6, 2017, Aug. 6, 2018, Mar. 8, 2019, Nov. 27, 2019, and the Notice of Allowance dated Apr. 21, 2020.
U.S. Appl. No. 14/249,665, now U.S. Pat. No. 9,792,026, the Office Actions dated May 16, 2016 and Feb. 22, 2017; and the Notices of Allowance dated Jun. 2, 2017 and Jul. 24, 2017.
U.S. Appl. No. 14/509,700, now U.S. Pat. No. 9,792,957, the Office Action dated Oct. 28, 2016; and the Notice of Allowance dated Jun. 15, 2017.
U.S. Appl. No. 15/703,462, the Office Action dated Jun. 21, 2019, and Dec. 27, 2019; and the Notice of Allowance dated Feb. 10, 2020.
U.S. Appl. No. 14/534,626, the Office Actions dated Nov. 25, 2015, Jul. 5, 2016, Jun. 5, 2017, Mar. 2, 2018, Sep. 26, 2018, May 8, 2019, Dec. 27, 2019; and Aug. 19, 2020.
U.S. Appl. No. 14/700,845, now U.S. Pat. No. 9,653,115, the Office Actions dated May 20, 2016, Dec. 2, 2016, May 22, 2017, Nov. 28, 2017, Jun. 27, 2018 and Feb. 19, 2019 and the Notice of Allowance dated Oct. 21, 2019.
U.S. Appl. No. 14/700,862, now U.S. Pat. No. 9,672,868, the Office Action dated Aug. 26, 2016; and the Notice of Allowance dated Mar. 9, 2017.
U.S. Appl. No. 14/835,857, now U.S. Pat. No. 10,460,765, the Office Actions dated Sep. 23, 2016, Jun. 5, 2017 and Aug. 9, 2018, and the Advisory Action dated Oct. 20, 2017; Notice of Allowances dated Feb. 25, 2019 and Jun. 7, 2019.
U.S. Appl. No. 16/559,082, the Office Action dated Feb. 2, 2020 and Jul. 23, 2020.
U.S. Appl. No. 16/800,994, the Office Action dated Apr. 15, 2020.
U.S. Appl. No. 14/978,464, the Office Actions dated Jul. 25, 2019, Dec. 14, 2018, May 18, 2018, Sep. 8, 2017, Dec. 14, 2018, Jul. 25, 2019, Nov. 18, 2019, Jul. 23, 2020.
U.S. Appl. No. 14/978,491, the Office Actions dated Sep. 8, 2017, May 25, 2018, Dec. 14, 2018, Aug. 12, 2019; Dec. 23, 2019; and Jul. 23, 2020.
U.S. Appl. No. 15/085,209, now U.S. Pat. No. 10,462,262, the Office Actions dated Feb. 26, 2018 and Dec. 31, 2018; the Notice of Allowance dated Aug. 12, 2019.
U.S. Appl. No. 15/165,373, the Office Actions dated Mar. 24, 2017, Oct. 11, 2017, May 18, 2018, Feb. 1, 2019, Aug. 8, 2019, and Jan. 3, 2020.
U.S. Appl. No. 15/189,931, now U.S. Pat. No. 10,218,760, the Office Actions dated Apr. 6, 2018, Notice of Allowance dated Oct. 24, 2018.
U.S. Appl. No. 15/395,477, the Office Actions dated Nov. 2, 2018, Aug. 16, 2019, and Apr. 15, 2019.
U.S. Appl. No. 15/997,284, the Office Actions dated Aug. 1, 2019, Nov. 21, 2019 and Apr. 28, 2020.
U.S. Appl. No. 15/863,191, now U.S. Pat. No. 10,257,578, the Notices of Allowance dated Jul. 5, 2018 and Nov. 23, 2018.
U.S. Appl. No. 16/591,103, the Office Action dated Apr. 22, 2020.
An ffmpeg and SDL Tutorial, "Tutorial 05: Synching Video," Retrieved from Internet on Mar. 15, 2013: <http://dranqer.com/ffmpeg/tutorial05.html>, (4 pages).
Archos Gen 5 English User Manual Version 3.0, Jul. 26, 2007, p. 1-81.
Bartlett, "iTunes 11: How to Queue Next Song," Technipages, Oct. 6, 2008, pp. 1-8, Retrieved from the Internet on Dec. 26, 2013, http://www.technipages.com/itunes-queue-next-song.html.
International Search Report and Written Opinion for International Patent Application PCT/IB2013/001000 dated Jul. 31, 2013 (11 pages).
International Search Report for International Application PCT/IL2010/000362 dated Aug. 25, 2010 (6 pages).

(56) References Cited

OTHER PUBLICATIONS

International Search Report for International Patent Application PCT/IL2012/000080 dated Aug. 9, 2012 (4 pages).
International Search Report for International Patent Application PCT/IL2012/000081 dated Jun. 28, 2012 (4 pages).
Labs.byHook: "Ogg Vorbis Encoder for Flash: Alchemy Series Part 1," Retrieved from Internet on on Dec. 17, 2012: URl:http://labs.byhook.com/2011/02/15/ogg-vorbis-encoder-for-flash-alchem-y-series-part-1/, 2011, 6 pages.
Miller, Gregor et al., "MiniDiver: A Novel Mobile Media Playback Interface for Rich Video Content on an iPhone™", Entertainment Computing A ICEV 2009, Sep. 3, 2009, pp. 98-109.
Sodagar, I., "The MPEG-DASH Standard for Multimedia Streaming Over the Internet", IEEE Multimedia, IEEE Service Center, New York, NY US, (2011) 18(4): 62-67.
Supplemental European Search Report for EP10774637.2 (PCT/IL2010/000362) dated Jun. 28, 2012 (6 pages).
Supplemental European Search Report for EP13184145 dated Jan. 30, 2014 (5 pages).
Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).
U.S. Appl. No. 12/706,721 U.S. Pat. No. 9,190,110 Published as US2010/0293455, System and Method for Assembling a Recorded Composition, filed Feb. 17, 2010.
U.S. Appl. No. 14/884,285 Published as US2017/0178601, Systems and Method for Assembling a Recorded Composition, filed Oct. 15, 2015.
U.S. Appl. No. 13/033,916 U.S. Pat. No. 9,607,655 Published as US2011/0200116, System and Method for Seamless Multimedia Assembly, filed Feb. 24, 2011.
U.S. Appl. No. 13/034,645 U.S. Pat. No. 11,232,458 Published as US2011/0202562, System and Method for Data Mining Within Interactive Multimedia, filed Feb. 24, 2011.
U.S. Appl. No. 17/551,847 Published as US2021/0366520, Systems and Methods for Data Mining Within Interactive Multimedia, filed Dec. 15, 2021.
U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619 Published as US2014/0082666, Progress Bar for Branched Videos, filed Sep. 19, 2012.
U.S. Appl. No. 14/639,579 U.S. Pat. No. 10,474,334 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 U.S. Pat. No. 10,418,066 Published as US2016/0217829, System and Method for Synchronization of Selectably Presentable Media Streams, filed Dec. 30, 2015.
U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 14/107,600 U.S. Pat. No. 10,448,119 Published as US2015/0067723, Methods and Systems for Unfolding Video Pre-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Systems for Seeking to Non-Key Frames, filed Dec. 24, 2013.
U.S. Appl. No. 14/249,627 U.S. Pat. No. 9,653,115 Published as US2015-0294685, Systems and Methods for Creating Linear Video From Branched Video, filed Apr. 10, 2014.
U.S. Appl. No. 15/481,916 U.S. Pat. No. 10,755,747 Published as US2017-0345460, Systems and Methods for Creating Linear Video From Branched Video, filed Apr. 7, 2017.
U.S. Appl. No. 16/986,977 Published as US2020/0365187, Systems and Methods for Creating Linear Video From Branched Video, filed Aug. 6, 2020.
U.S. Appl. No. 14/249,665 U.S. Pat. No. 9,792,026 Published as US2015/0293675, Dynamic Timeline for Branched Video, filed Apr. 10, 2014.
U.S. Appl. No. 14/509,700 U.S. Pat. No. 9,792,957 Published as US2016/0104513, Systems and Methods for Dynamic Video Bookmarking, filed Oct. 8, 2014.
U.S. Appl. No. 14/534,626 U.S. Pat. No. 10,692,540 Published as US-2018-0130501-A1, Systems and Methods for Dynamic Video Bookmarking, filed Sep. 13, 2017.
U.S. Appl. No. 16/865,896 U.S. Pat. No. 10,885,944 Published as US2020/0265870, Systems and Methods for Dynamic Video Bookmarking, filed May 4, 2020.
U.S. Appl. No. 17/138,434 Published as US2021/0366520, Systems and Methods for Dynamic Video Bookmarking, filed Dec. 30, 2020.
U.S. Appl. No. 17/701,168, Systems and Methods for Dynamic Video Bookmarking, filed Mar. 22, 2022.
U.S. Appl. No. 14/534,626 Published as US2016/0105724, Systems and Methods for Parallel Track Transitions, filed Nov. 6, 2014.
U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.
U.S. Appl. No. 16/752,193 Published as US2020/0404382, Systems and Methods for Nonlinear Video Playback Using Linear Real-Time Video Players, filed Jan. 24, 2020.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 U.S. Pat. No. 10,460,765 Published as US2017/0062012, Systems and Methods for Adaptive and Responsive Video, filed Aug. 26, 2015.
U.S. Appl. No. 16/559,082 Published as US2019/0392868, Systems and Methods for Adaptive and Responsive Video, filed Sep. 3, 2019.
U.S. Appl. No. 14/978,464 U.S. Pat. No. 11,164,548 Published as US2017/0178601, Intelligent Buffering of Large-Scale Video, filed Dec. 22, 2015.
U.S. Appl. No. 14/978,491 U.S. Pat. No. 11,128,853 Published as US2017/0178409, Seamless Transitions in Large-Scale Video, filed Dec. 22, 2015.
U.S. Appl. No. 17/403,703 Published as US2022/0038673, Seamless Transitions in Large-Scale Video, filed Aug. 16, 2021.
U.S. Appl. No. 15/085,209 U.S. Pat. No. 10,462,202 Published as US2017/0289220, Media Stream Rate Synchronization, filed Mar. 30, 2016.
U.S. Appl. No. 15/165,373 Published as US2017/0295410, Symbiotic Interactive Video, filed May 26, 2016.
U.S. Appl. No. 15/189,931 U.S. Pat. No. 10,218,760 Published as US2017/0374120, Dynamic Summary Generation for Real-time Switchable Videos, filed Jun. 22, 2016.
U.S. Appl. No. 15/395,477 U.S. Pat. No. 11,050,809 Published as US2018/0191574, Systems and Methods for Dynamic Weighting of Branched Video Paths, filed Dec. 30, 2016.
U.S. Appl. No. 15/395,477 Published as US2021/0281626, Systems and Methods for Dynamic Weighting of Branched Video Paths, filed Dec. 30, 2016.
U.S. Appl. No. 15/997,284 Published as US2019/0373330, Interactive Video Dynamic Adaptation and User Profiling, filed Jun. 4, 2018.

(56) References Cited

OTHER PUBLICATIONS

U.S. Appl. No. 15/863,191 U.S. Pat. No. 10,257,578, Dynamic Library Display for Interactive Videos, filed Jan. 5, 2018.

U.S. Appl. No. 16/283,066 U.S. Pat. No. 10,856,049 Published as US2019/0349637, Dynamic Library Display for Interactive Videos, filed Feb. 22, 2019.

U.S. Appl. No. 16/591,103 Published as US2021/0105433, Systems and Methods for Dynamically Adjusting Video Aspect Ratios, filed Oct. 2, 2019.

U.S. Appl. No. 16/793,205 Published as US2021/0258647, Dynamic Adaptation of Interactive Video Players Using Behavioral Analytics, filed Feb. 18, 2020.

U.S. Appl. No. 16/793,201 Published as US2021/0258640, Systems and Methods for Detecting Anomalous Activities for Interactive Videos, filed Feb. 18, 2020.

U.S. Appl. No. 16/922,540 Published as US2022/0014817, Systems and Methods for Seamless Audio and Video Endpoint Transitions, filed Jul. 7, 2020.

U.S. Appl. No. 17/462,199, Shader-based dynamic video manipulation, filed Aug. 31, 2021.

U.S. Appl. No. 17/462,222, Shader-based dynamic video manipulation, filed Aug. 31, 2021.

U.S. Appl. No. 17/334,027, Automated platform for generating interactive videos, filed May 28, 2021.

U.S. Appl. No. 17/484,604, Discovery engine for interactive videos, filed Sep. 24, 2021.

U.S. Appl. No. 17/484,635, Video player integration within websites, filed Sep. 24, 2021.

Google Scholar search, "Inserting metadata inertion advertising video", Jul. 16, 2021, 2 pages.

Marciel, M. et al., "Understanding the Detection of View Fraud in Video Content Portals", (Feb. 5, 2016), Cornell University, pp. 1-13.

International Preliminary Report and Written Opinion of PCT/IL2012/000080 dated Aug. 27, 2013, 7 pages.

\* cited by examiner

DYNAMIC LIBRARY DISPLAY FOR INTERACTIVE VIDEOS

CROSS-REFERENCE TO RELATED APPLICATIONS

This application is a continuation of and claims priority to U.S. patent application Ser. No. 16/283,066, titled "Dynamic Library Display For Interactive Videos" and filed on Feb. 22, 2019 under, which is a continuation of U.S. patent application Ser. No. 15/863,191, titled "Dynamic Library Display For Interactive Videos" and filed on Jan. 5, 2018, now U.S. Pat. No. 10,257,578, issued on Apr. 9, 2019 under, which are hereby incorporated by reference herein their entireties.

FIELD OF THE INVENTION

The present disclosure relates generally to audiovisual presentations and, more particularly, to systems and methods for dynamically modifying the features of a video library display based on decisions made in interactive videos.

BACKGROUND

Online streaming and cable media services often present viewers with a library display on their computers, televisions, or other devices that allows the viewers to browse among television shows, movies, and other various forms of media content. Netflix, Amazon Video, and Hulu, for example, make it easy for a viewer to browse through a library of episodes for a television series and view information about each episode, such as the title, actors, episode length, and a representative image. This information is generally static and the same for all viewers, as it is representative of static media content. With interactive videos, however, static information may not adequately describe the videos for users having different individual experiences in the interactive videos.

SUMMARY

Systems and methods are described for implementing a video library interface/display having a listing of interactive videos and information associated therewith that is dynamically updated based on user decisions made within the interactive videos. In one aspect, a computer-implemented method includes the steps of providing an interactive video comprising a plurality of traversable video paths; receiving, during presentation of the interactive video to a user, a first interaction with the interactive video, the first interaction comprising a decision made by the user in the interactive video; traversing a particular video path in the interactive video in response to the first interaction; providing a video library display comprising a visual depiction of information associated with a plurality of videos; and dynamically modifying the video library display based on one or more interactions made by the user with respect to the interactive video, the one or more interactions including the first interaction. Other aspects of the foregoing include corresponding systems and computer programs on non-transitory storage media.

Various implementations can include one or more of the following features. The videos include individual episodes of a series. The visual depiction of information comprises a list of the videos, and dynamically modifying the video library display comprises removing one of the videos from the list, adding a video to the list, or changing an order of videos in the list. The visual depiction of information comprises at least one of metadata associated with a particular video, a thumbnail image of a particular video, and a summary of a particular video. Dynamically modifying the video library display comprises modifying the metadata, thumbnail image, or summary of a first one of the videos. The metadata, thumbnail image, or summary of the first video is modified to reflect one or more decisions made by the user in the first video. Dynamically modifying the video library display comprises including in the video library display supplemental content relating to one or more of the plurality of videos.

In one implementation, a selection of a first one of the videos in the video library display is received, and presentation of the first video is commenced at a first decision point in the first video, where a plurality of possible traversable video paths branch from the first decision point. The visually depicted information can include visual references to a plurality of traversable decision points in the first video including the first decision point, and presentation of the first video can be commenced based on receiving a selection of the first decision point in the visual references by the user.

In another implementation, a first one of the videos comprises an interactive video comprising a plurality of traversable video paths; the first video is presented a plurality of times, wherein in each presentation of the first video, at least one different video path is traversed; information relating to the different traversed video paths is aggregated over the plurality of times the first video is presented; and the video library display is dynamically modified by including in the visual depiction of information the aggregated information.

Further aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Figure 1:
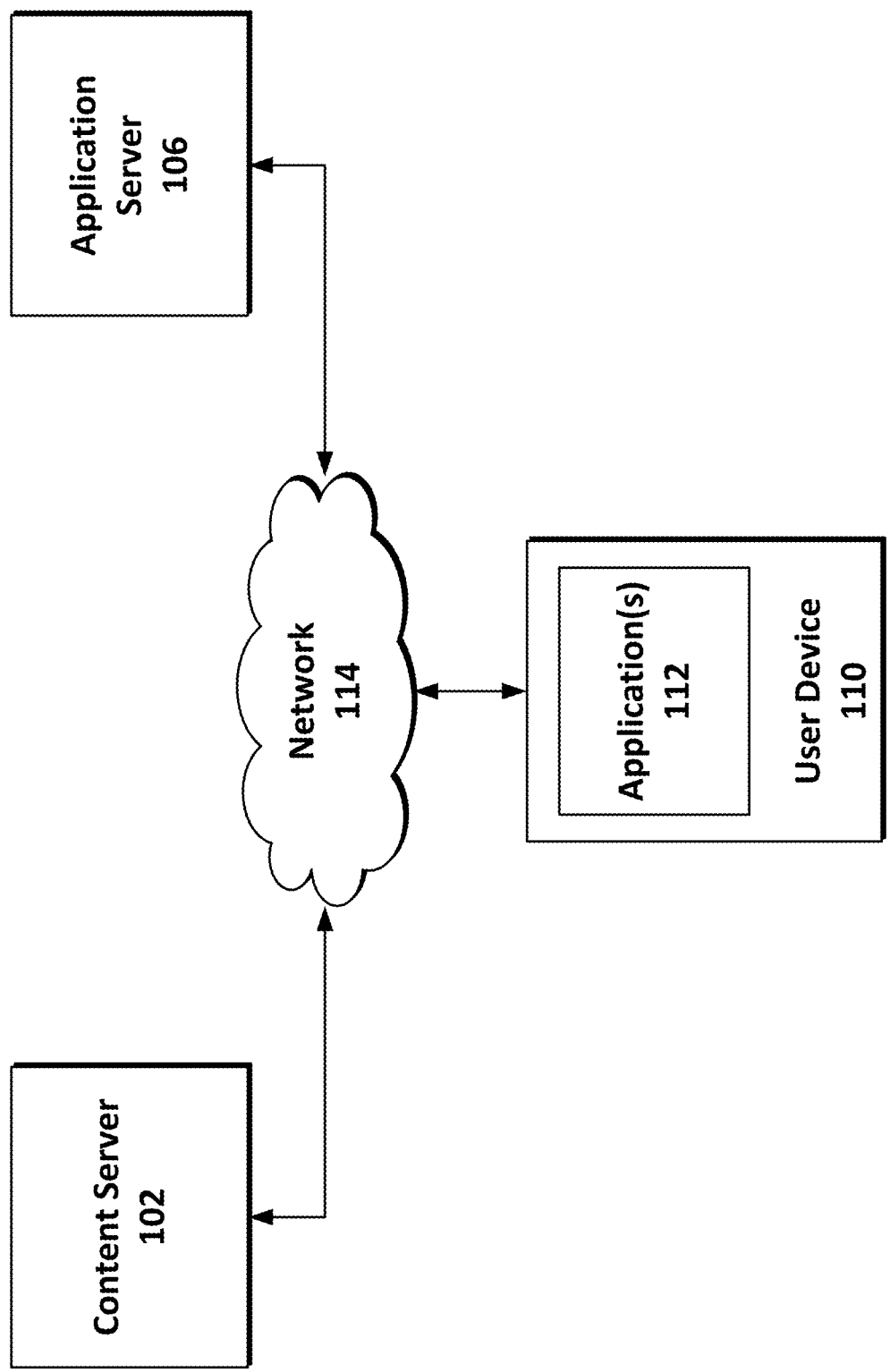
FIG. 1 depicts a high-level system architecture for providing interactive media content according to an implementation.

Described herein are various implementations of methods and supporting systems for dynamically modifying a video library display based on decisions made, paths traversed, or other events occurring in an interactive video. FIG. 1 depicts a high-level architecture of such a system according to an implementation. A media presentation having multiple video and/or audio streams can be presented to a user on a user device 110 having one or more application(s) 112 that together are capable of playing and/or editing the content and displaying a video library where information associated with videos can browsed and videos can be selected for playback. The user device 110 can be, for example, a smartphone, tablet, laptop, desktop, palmtop, television, gaming device, virtual reality headset, smart glasses, smart watch, music player, mobile telephone, workstation, or other computing device configured to execute the functionality described herein. The user device 110 can have output functionality (e.g., display monitor, touchscreen, image projector, etc.) and input functionality (e.g., touchscreen, keyboard, mouse, remote control, etc.).

The application 112 can be a video player/editor and library browser that is implemented as a native application, web application, or other form of software. In some implementations, the application 112 is in the form of a web page, widget, and/or Java, JavaScript, .Net, Silverlight, Flash, and/or other applet or plug-in that is downloaded to the user device 110 and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology, can also be employed.

Media content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

More generally, the techniques described herein can be implemented in any suitable hardware or software. If implemented as software, the processes can execute on a system capable of running one or more custom operating systems or commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented a computer including a processing unit, a system memory, and a system bus that couples various system components including the system memory to the processing unit.

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

The media presentations referred to herein can be structured in various forms. For example, a particular media presentation can be an online streaming video having multiple tracks or streams that a user can switch among in real-time or near real-time. For example, a media presentation can be structured using parallel audio and/or video tracks as described in U.S. patent application Ser. No. 14/534,626, filed on Nov. 6, 2014, and entitled "Systems and Methods for Parallel Track Transitions," the entirety of which is incorporated by reference herein. More specifically, a playing video file or stream can have one or more parallel tracks that can be switched among in real-time automatically and/or based on user interactions. In some implementations, such switches are made seamlessly and substantially instantaneously, such that the audio and/or video of the playing content can continue without any perceptible delays, gaps, or buffering. In further implementations, switches among tracks maintain temporal continuity; that is, the tracks can be synchronized to a common timeline so that there is continuity in audio and/or video content when switching from one track to another (e.g., the same song is played using different instruments on different audio tracks; same storyline performed by different characters on different video tracks, and the like).

Such media presentations can also include interactive video structured in a video tree, hierarchy, or other form. A video tree can be formed by nodes that are connected in a branching, hierarchical, or other linked form. Nodes can each have an associated video segment, audio segment, graphical user interface (GUI) elements, and/or other associated media. Users (e.g., viewers) can watch a video that begins from a starting node in the tree and proceeds along connected nodes in a branch or path. Upon reaching a point during playback of the video where multiple video segments (child nodes) branch off from a segment (parent node), the user can interactively select the branch or path to traverse and, thus, the next video segment to watch.

As referred to herein, a particular branch or path in an interactive media structure, such as a video tree, can refer to a set of consecutively linked nodes between a starting node and ending node, inclusively, or can refer to some or all possible linked nodes that are connected subsequent to (e.g., sub-branches) or that include a particular node. Branched video can include seamlessly assembled and selectably presentable multimedia content such as that described in U.S. patent application Ser. No. 13/033,916, filed on Feb. 24, 2011, and entitled "System and Method for Seamless Multimedia Assembly" (the "Seamless Multimedia Assembly application"), and U.S. patent application Ser. No. 14/107,600, filed on Dec. 16, 2013, and entitled "Methods and Systems for Unfolding Video Pre-Roll," the entireties of which are hereby incorporated by reference.

The prerecorded video segments in a video tree or other structure can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the end of the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles, preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments can form a seamless multimedia content path or branch, and users can take multiple paths over multiple playthroughs, and experience different complete, start-to-finish, seamless presentations. Further, one or more multimedia segments can be shared among intertwining paths while still ensuring a seamless transition from a previous segment and to the next segment. The content paths can be predefined, with fixed sets of possible transitions in order to ensure seamless transitions among segments. The content paths can also be partially or wholly undefined, such that, in some or all instances, the user can switch to any known video segment without limitation. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. Some or all of the displayed options can hover and then disappear when the decision period ends or when an option has been selected. Further, a timer, countdown or other visual, aural, or other sensory indicator can be presented during playback of content segment to inform the user of the point by which he should (or, in some cases, must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

A segment that is played after (immediately after or otherwise) a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

Figure 2:
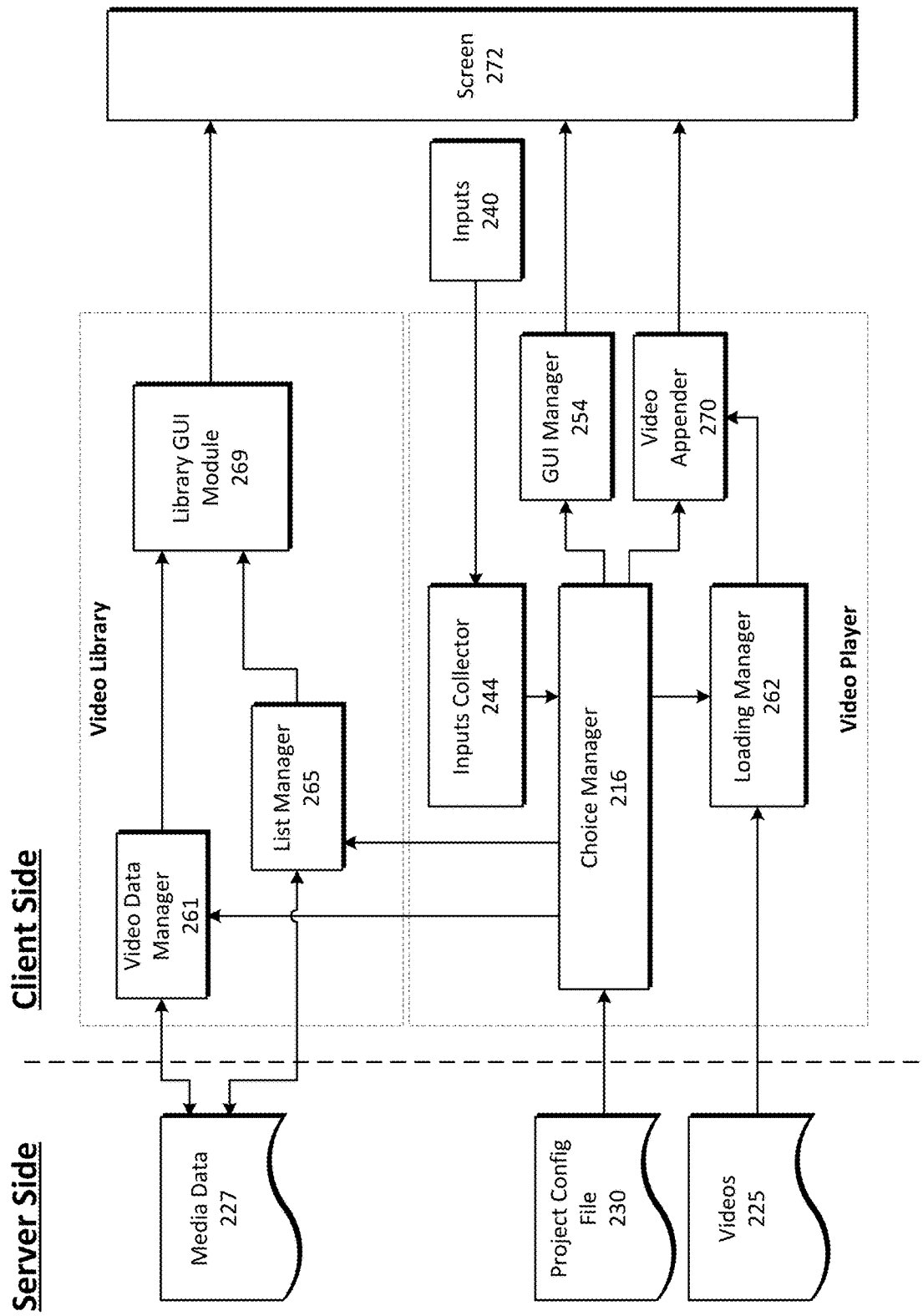
FIG. 2 depicts an example client-server system architecture for providing a dynamically updating video library interface.

FIG. 2 depicts one implementation of a detailed architecture of client-side components in application 112 on user device 110, including inputs received from remote sources, such as content server 102 and application server 106. Client-side components include a video player component having a Choice Manager 216, Inputs Collector 244, GUI Manager 254, Loading Manager 262, and Video Appender 270 and a video library component having a Video Data Manager 261, List Manager 264, and Library GUI Module 269. In general, the video player component includes functionality to play the various forms of interactive videos described herein, and the video library component includes functionality to provide and manage a browseable library of media information, as further described below. Content server 102 can make available to the client Videos 225 and other media content, and Media Data 227 associated with the media content (e.g., titles, metadata, images, etc.). The server can also provide a Project Configuration File 230, as further described below.

Inputs Collector 244 receives user inputs 240 from input components such as a device display screen 272, keyboard, mouse, microphone, virtual reality headset, and the like. Such inputs 240 can include, for example, mouse clicks, keyboard presses, touchpad presses, eye movement, head movement, voice input, and other interactions. Inputs Collector 244 provides input information based on the inputs 240 to Choice Manager 216, which also receives information from a Project Configuration File 230 to determine which video segment should be currently played and which video segments may be played or presented as options to be played at a later time. Choice Manager 216 notifies Video Appender 270 of the video segment to be currently played, and Video Appender 270 seamlessly connects that video segment to the video stream being played in real time. Choice Manager 216 notifies Loading Manager 262 of the video segments that may be played or presented as options to be played at a later time.

Project Configuration File 230 can include information defining the media presentation, such as the video tree or other structure, and how video segments can be linked together in various manners to form one or more paths. Project Configuration File 230 can further specify which audio, video, and/or other media files correspond to each segment (e.g., node in a video tree), that is, which audio, video, and/or other media should be retrieved when application 112 determines that a particular segment should be played. Additionally, Project Configuration File 230 can indicate interface elements that should be displayed or otherwise presented to users, as well as when the elements should be displayed, such that the audio, video, and interactive elements of the media presentation are synchronized. Project Configuration File 230 can be stored on user device 110 or can be remotely accessed by Choice Manager 216.

In some implementations, Project Configuration File 230 is also used in determining which media files should be loaded or buffered prior to being played (or potentially played). Because decision points can occur near the end of a segment, it may be necessary to begin transferring one or more of the potential next segments to viewers prior to a selection being made. For example, if a viewer is approaching a decision point with three possible branches, all three potential next segments can be preloaded partially or fully to ensure a smooth transition upon conclusion of the current segment. Intelligent buffering and progressive downloading of the video, audio, and/or other media content can be performed as described in U.S. patent application Ser. No. 13/437,164, filed Apr. 2, 2012, and entitled "Systems and Methods for Loading More Than One Video Content at a Time," the entirety of which is incorporated by reference herein.

Using information in Project Configuration File 230, Choice Manager 216 can inform GUI Manager 254 of which interface elements should be displayed to viewers on screen 272. Project Configuration File 230 can further indicate the specific timings for which actions can be taken with respect to the interface elements (e.g., when a particular element is active and can be interacted with). The interface elements can include, for example, playback controls (pause, stop, play, seek, etc.), segment option selectors (e.g., buttons, images, text, animations, video thumbnails, and the like, that a viewer can interact with during decision periods, the selection of which results in a particular multimedia segment being seamlessly played following the conclusion of the current segment), timers (e.g., a clock or other graphical or textual countdown indicating the amount of time remaining to select an option or next segment, which, in some cases, can be the amount of time remaining until the current segment will transition to the next segment), links, popups, an index (e.g., for browsing and/or selecting other multimedia content to view or listen to), and/or a dynamic progress bar such as that described in U.S. patent application Ser. No. 13/622,795, filed Sep. 19, 2012, and entitled "Progress Bar for Branched Videos," the entirety of which is incorporated by reference herein. In addition to visual elements, sounds or other sensory elements can be presented. For example, a timer can have a "ticking" sound synchronized with the movement of a clock hand. The interactive interface elements can be shared among multimedia segments or can be unique to one or more of the segments.

In addition to reading information from Project Configuration File 230, Choice Manager 216 is notified of user interactions (e.g., mouse clicks, keyboard presses, touchpad presses, eye movements, etc.) from Inputs Collector 244, which interactions can be translated into actions associated with the playback of a media presentation (e.g., segment selections, playback controls, etc.). Based thereon, Choice Manager 216 notifies Loading Manager 262, which can process the actions as further described below. Choice Manager 216 can also interface with Loading Manager 262 and Video Appender 270. For example, Choice Manager 216 can listen for user interaction information from Inputs Collector 244 and notify Loading Manager 262 when an interaction by the viewer (e.g., a selection of an option displayed during the video) has occurred. In some implementations, based on its analysis of received events, Choice Manager 216 causes the presentation of various forms of sensory output, such as visual, aural, tactile, olfactory, and the like.

As earlier noted, Choice Manager 216 can also notify Loading Manager 262 of video segments that may be played at a later time, and Loading Manger 262 can retrieve the corresponding videos 225 (whether stored locally or on, e.g., content server 102) to have them prepared for potential playback through Video Appender 270. Choice Manager 216 and Loading Manager 262 can function to manage the downloading of hosted streaming media according to a loading logic. In one implementation, Choice Manager 216 receives information defining the media presentation structure from Project Configuration File 230 and, using information from Inputs Collector 244, determines which media segments to download and/or buffer (e.g., if the segments are remotely stored). For example, if Choice Manager 216 informs Loading Manager 262 that a particular segment A will or is likely to be played at an upcoming point in the presentation timeline, Loading Manager 262 can intelligently request the segment for download, as well as additional media segments X, Y and Z that can be played following segment A, in advance of playback or notification of potential playback thereof. The downloading can occur even if fewer than all of X, Y, Z will be played (e.g., if X, Y and Z are potential segment choices branching off segment A and only one will be selected for playback).

In some implementations, Loading Manager 262 ceases or cancels downloading of content segments or other media if it determines that it is no longer possible for a particular media content segment (or other content) to be presented on a currently traversed media path. Referring to the above example, a user interacts with the video presentation such that segment Y is determined to be the next segment that will be played. The interaction can be received by Choice Manager 216 and, based on its knowledge of the path structure of the video presentation, Loading Manager 262 is notified to stop active downloads or dequeue pending downloads of content segments no longer reachable now that segment Y has been selected.

Video Appender 270 receives media content from Loading Manager 262 and instructions from Choice Manager 216 on which media segments to include in a media presentation. Video Appender 270 can analyze and/or modify raw video or other media content, for example, to concatenate two separate media streams into a single timeline. Video Appender 270 can also insert cue points and other event markers, such as junction events, into media streams. Further, Video Appender 270 can form one or more streams of bytes from multiple video, audio or other media streams, and feed the formed streams to a video playback function such that there is seamless playback of the combined media content on display screen 272 (as well as through speakers for audio, for example).

The client-side video library component includes subcomponents that provide for the management of a browseable library of media information using Media Data 227 received from a server. Video Data Manager 261 receives Media Data 227 and, based on this information, loads and manages the various types of information associated with each available item of media content. List Manager 265 utilizes Media Data 227 to load and manage a listing of all available items of media content. Library GUI Module 269 receives the media information and listing constructed by Video Data Manager 261 and List Manager 265, respectively, and combines this data into a library interface for output to screen 272. A user can interact with the library interface by navigating through the library, viewing information associated with the library items, and selecting an item to play. Subsequently, using playback interfaces in the video player, the user can control the playing media using controls such as play, stop, pause, toggle subtitles, fast-forward, fast-backward, etc.

The video library and video player components also communicate through Choice Manager 216, which as earlier described receives user interactions with playing content through Inputs Collector 244. More specifically, based on the received user interactions, Choice Manager 216 informs List Manager 265 which items of media content should be included in or excluded from the media item listing generated by List Manager 265, and informs Video Data Manager 261 which media information (e.g., metadata, thumbnail images, etc.) can be presented in the video library user interface. In some implementations, List Manager 265 and Video Data Manager 261 save the listing and media information configurations locally and/or on the server for use in regenerating the video library interface at a later time.

In some implementations, application 112 tracks data regarding user interactions, users, and/or player devices, and provides the data to an analytics server. Collected analytics can include, but are not limited to: the number, type, and/or location of a device; user data, such as login information, name, address, age, sex, and the like; user interactions, such as button/touchpad presses, mouse clicks, mouse/touchpad movements, interaction timings, and the like; decisions made by users or automatically (e.g., content segment user choices or default selections); and content paths followed in the presentation content structure. The analytics can include those described in U.S. patent application Ser. No. 13/034, 645, entitled "System and Method for Data Mining within Interactive Multimedia," and filed Feb. 24, 2011, the entirety of which is incorporated by reference herein.

Figure 3:
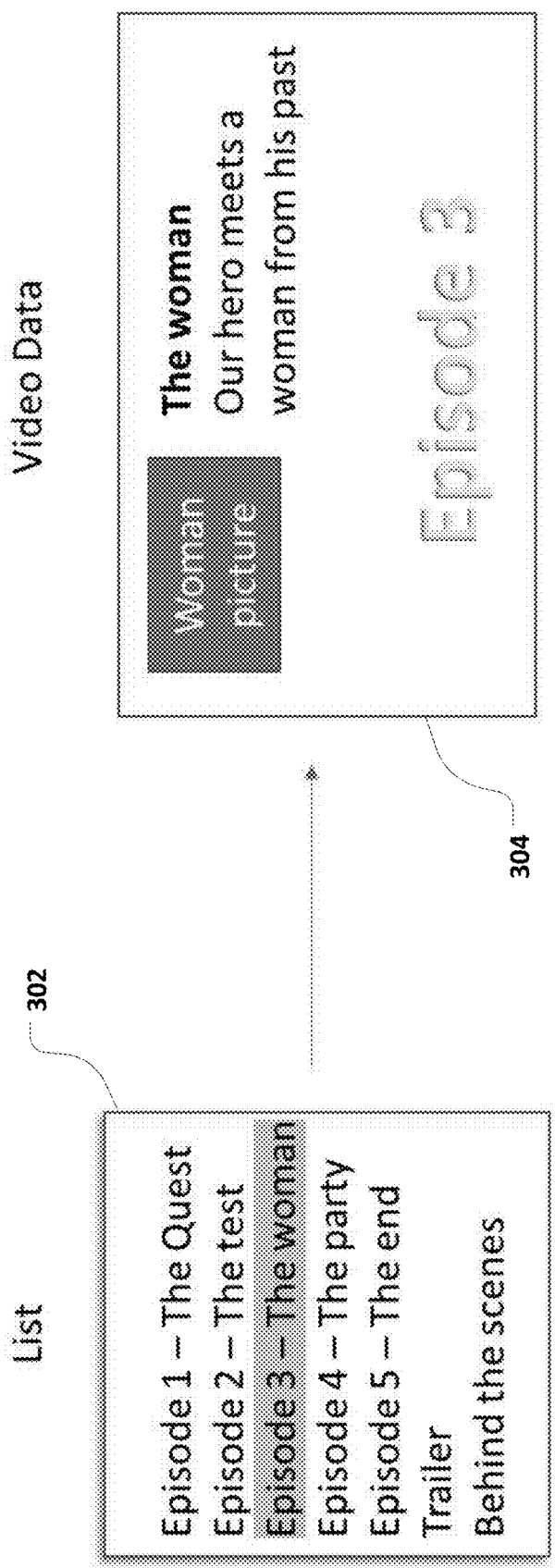
FIG. 3 depicts example displays of a standard video library interface.

FIG. 3 depicts a generic interface or display for a video library, in which media list 302 provides a list of episode titles for a video series (i.e., "Episode 1—The Quest", "Episode 2—The Test," and so on), as well as titles for supplemental content for the series (i.e., "Trailer" and "Behind the scenes"). Upon browsing to a particular item in the media list 302 (here, Episode 3), a video information display screen 304 is displayed that provides information about the selected item. For example, the video information display screen 304 can depict the episode title, a brief description of the episode, and a representative image of the episode, among other information (e.g., synopsis, actors, genre, tags, etc.). The user can also commence playback of selected media from the media list 302 or video information display screen 304.

In one implementation, media list 302 and/or video information display screen 304 dynamically change based on decisions made by a user or other events occurring within one or more interactive videos. Such interactive videos can include those shown in media list 302 and/or other videos not listed. One will appreciate the various ways in which the displays can change based on the decisions and events, including but not limited to including or excluding episodes or other media items from the media list 302, changing the order of the media items in the media list 302, providing different default information or modifying information (e.g., metadata, thumbnail image, summary, etc.) in the video information display screen 304 for a particular media item, including supplemental content (e.g., trailers, behind the scenes videos, interviews, etc.) in the media list 302, and so on.

Figure 4:
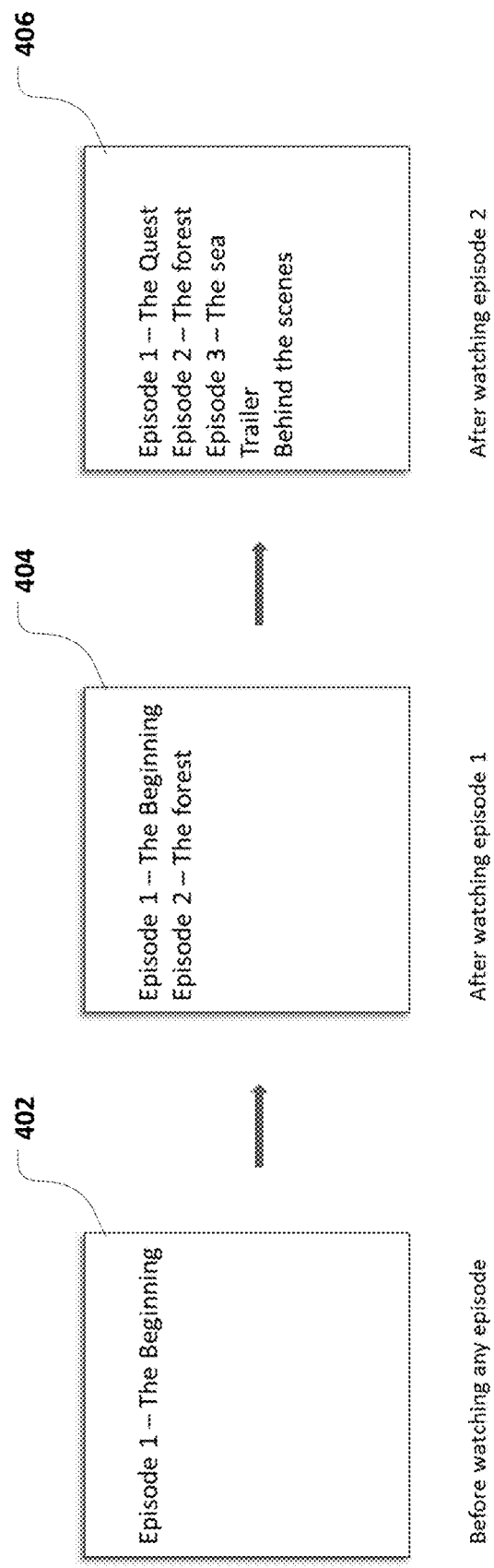
FIG. 4 depicts the progression of an episode listing in one implementation of a video library interface.

In one example, as shown in FIG. 4, the video library interface can provide a visual depiction of a listing of interactive episodes that dynamically changes as a user progresses through the episodes. Initially, listing 402 shows only "Episode 1—The Beginning," prior to the user watching any episodes. The user can select Episode 1 to watch, and can interact with the video and make decisions during playback that affect how the video proceeds. Near the end of the presentation of interactive Episode 1, the user is provided with an in-video map and given the opportunity to proceed to a forest or a city. Depending on the choice the user makes, the video library interface is updated to reflect the user's decision. More specifically, the library interface changes from listing 402 to listing 404, and now includes "Episode 2—The Forest." On the other hand, had the user decided to proceed to the city at the end of the first episode, the video listing would instead include "Episode 2—The City." Similarly, at the end of Episode 2, the user is given the choice to travel to a castle or the sea. Upon selecting the sea, the library interface changes from listing 404 to listing 406, which displays the first two episodes representing the user's path thus far, and "Episode 3—The Sea" as the next episode in the series to watch. In some implementations, and as shown in listing 406, supplemental content relating to the user's decisions can be included. Here, a trailer is added, as well as behind the scenes footage that corresponds to the "Episode 2—The Forest." In other implementations, the video library interface displays three episodes prior to the user viewing any particular episode, and as the user progresses through the episodes, the names of the episodes in the interface change to reflect the user's choices (e.g., "Episode 2" can become "Episode 2—The City" if the user heads to the city at the end of Episode 1).

Figure 5A:
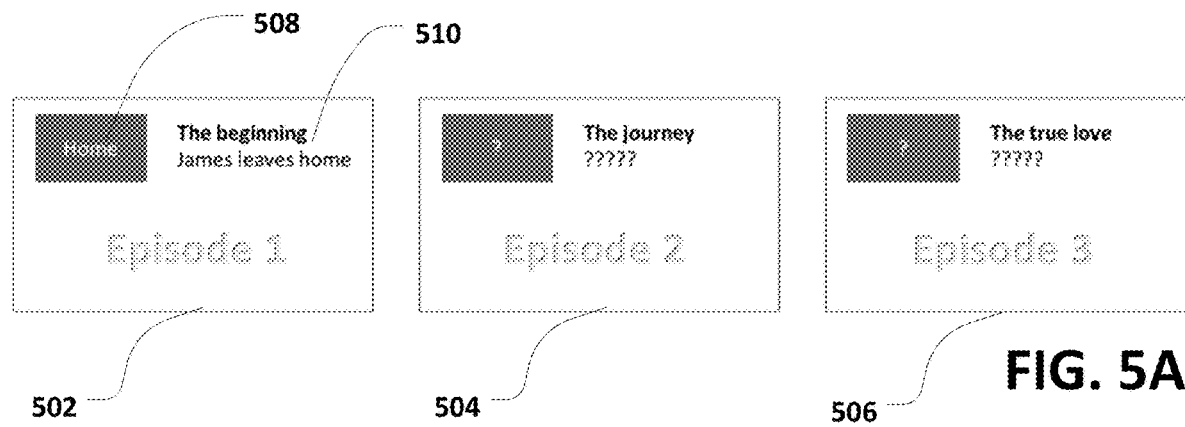
FIGS. 5A-5C depict various progressions of video information screens in one implementation of a video library interface.
Figure 5B:
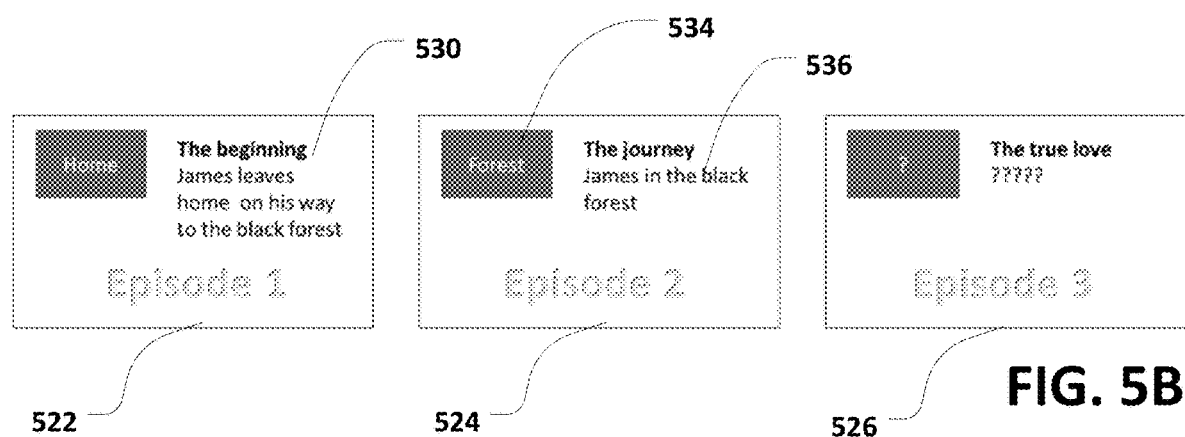
Figure 5C:
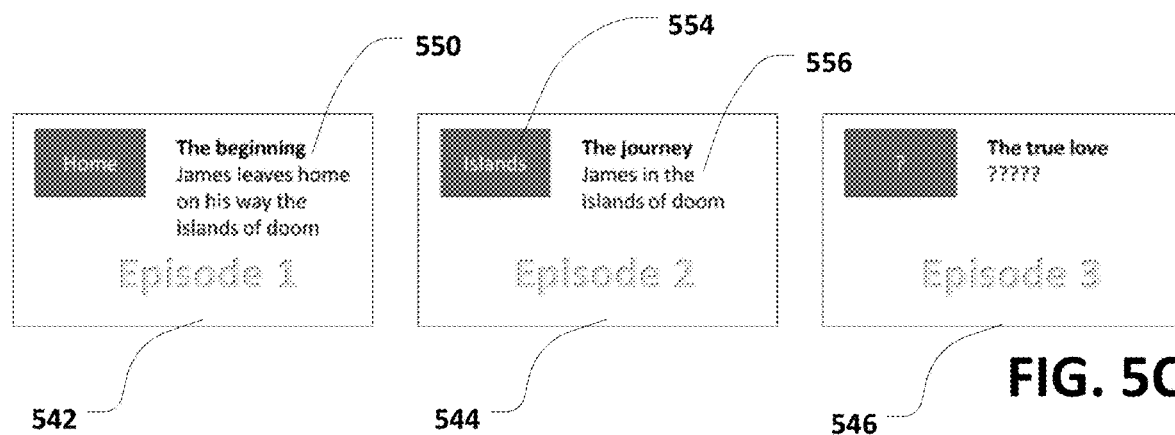

In one implementation, the user's progression through an interactive episodic series causes information about the episodes to be change within the video library interface. Referring to FIGS. 5A-5C, an interactive series has three interactive episodes, and the user can choose his path through the episodes while viewing them. FIG. 5A depicts video information display screens 502, 504, and 506 for episodes 1-3, respectively, of the interactive series prior to the user watching any of the episodes. At this point in time, video information display screen 502 (for episode 1) includes metadata 510 (episode title and brief description) and a representative thumbnail image 508 of the episode. However, the video information display screens 504 and 506 for episodes 2 and 3, respectively, have yet to include any description or thumbnail images of those episodes because the user has not yet made any decision in episode 1 or later episodes (or, in some instances, other videos not in the series) that would determine what content episodes 2 and 3 would contain.

During presentation of the first interactive video, the user is given the option for the character, James, to travel to "the black forest" or "the islands of doom." FIG. 5B depicts the video information display screens 522, 524, and 526 for episodes 1-3, respectively, following the user's decision for James to travel to the black forest in episode 1, but before starting episode 2. The metadata 530 in video information display screen 522 for episode 1 is updated to reflect that James left home and traveled toward the black forest. Likewise, video information display screen 524 for episode 2 is dynamically modified so that the metadata 536 refers to the black forest, and the thumbnail image 534 depicts an image of the black forest. Consequently, when the user selects interactive episode 2 for playback, he will begin his journey where episode 1 left off, i.e., traveling to the black forest. Because episode 2 has yet to be viewed, there are no changes to video information display screen 526 for episode 3.

FIG. 5C illustrates the state of the video information display screens 542, 544, and 546 for episodes 1-3, respectively, if the user instead decides to travel to the islands of doom instead of the black forest at the end of episode 1. Here, the metadata 550 for episode 1 is updated instead to state that James is on his way to the islands of doom. Likewise, video information display screen 544 for episode 2 includes a brief description 556 of the islands of doom episode and a representative thumbnail image 554 of the islands. Again, there is no change to video information display screen 546 for episode 3.

Figure 6:
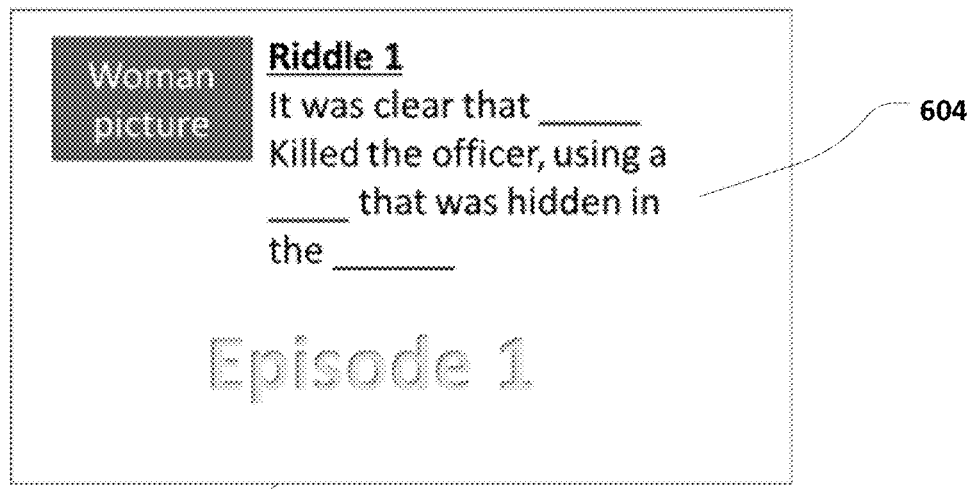
FIG. 6 depicts an example video information screen with partial video metadata.

In some implementations, the metadata for a particular video is partially displayed in a video information display screen. For example, the summary description for an interactive video can have blank spaces that are filled in as a user progresses through that video or through other videos. Referring to FIG. 6, consider, for instance, an interactive murder mystery episode series, where each episode has a description that is initially only partially present, but becomes increasingly filled in as the user progresses through the episodes and makes decisions on behalf of a detective character that solve parts of the mystery. On the video information display screen 602 for episode 1, the description 604 for the episode can be, for example, "It was clear that _____ killed the officer, using a _____ that was hidden in the _____." Based on decisions made by the user in watching episode 1 (e.g., exploring a particular area, examining certain items, etc.), the description 604 can be updated as the episode progresses or when it is completed. For example, if the path that the user takes through episode 1 results in the discovery of the murder weapon, but not the murderer, the new description for episode 1 can be, "It was still unclear who killed the officer, but the murder was committed with a candlestick that was hidden in the conservatory." In other implementations, default values, images, or text can be used instead of partial metadata or blanks. For example, the default summary description for episode 1 prior to the user watching the episode can be, "The police officer was killed around midnight, but by whom and with what weapon still remain a mystery."

Figure 7:
FIG. 7 depicts an example video information screen with decision point links.

In one implementation, the video library interface allows the user to select a video for playback from, for example, the video title listing or a video information display screen. FIG. 7 depicts one such video information display screen 702 for an episode titled, "The Quest." In this episode, the main character, Irene, progresses through a storyline that the user can affect by his decisions. The episode description 704 reflects the decisions of a user who has already watched the video and made decisions resulting in the storyline of, "Irene went to a party, she talked to Drew and then they went to the airport." The decisions made by the user are the text portions of the description 704 in bold, including the choice of going to a party (versus a different destination), talking to Drew (instead of another person), and going to the airport (rather than another location).

Notably, not only can the user start playback of episode 1 from this screen 702, but the user can also easily navigate to a particular decision point in the interactive video. This allows the user to change his previous decision, if desired, and continue the video from that point (or start from a particular decision point on the first playback of the video). To facilitate this navigation process, the metadata (episode description 704) in the video information display screen 702 for the video includes links that the user can select. As noted above, the description 704 includes three bolded portions of text ("party", "Drew", and "airport") that correspond to decision points in episode 1, and by selecting one of the text portions, the user can navigate to the corresponding decision point in the episode. Thus, for example, by selecting "Drew," the user can start episode 1 at the point in time where Irene is deciding whom at the party to talk to, and can choose to speak with someone else. The episode will then continue based on the new decision, and the episode metadata can be updated accordingly. Similarly, if the user decides to restart the episode from the beginning and make different decisions within the episode, the metadata associated for all decisions in that episode can dynamically change as well. In further implementations, video summaries can exhibit similar behavior; e.g., when a user interacts with (clicks, taps, etc.) a particular video summary, he will be navigated to the part of the video where the decision reflected in the summary was made.

Figure 8:
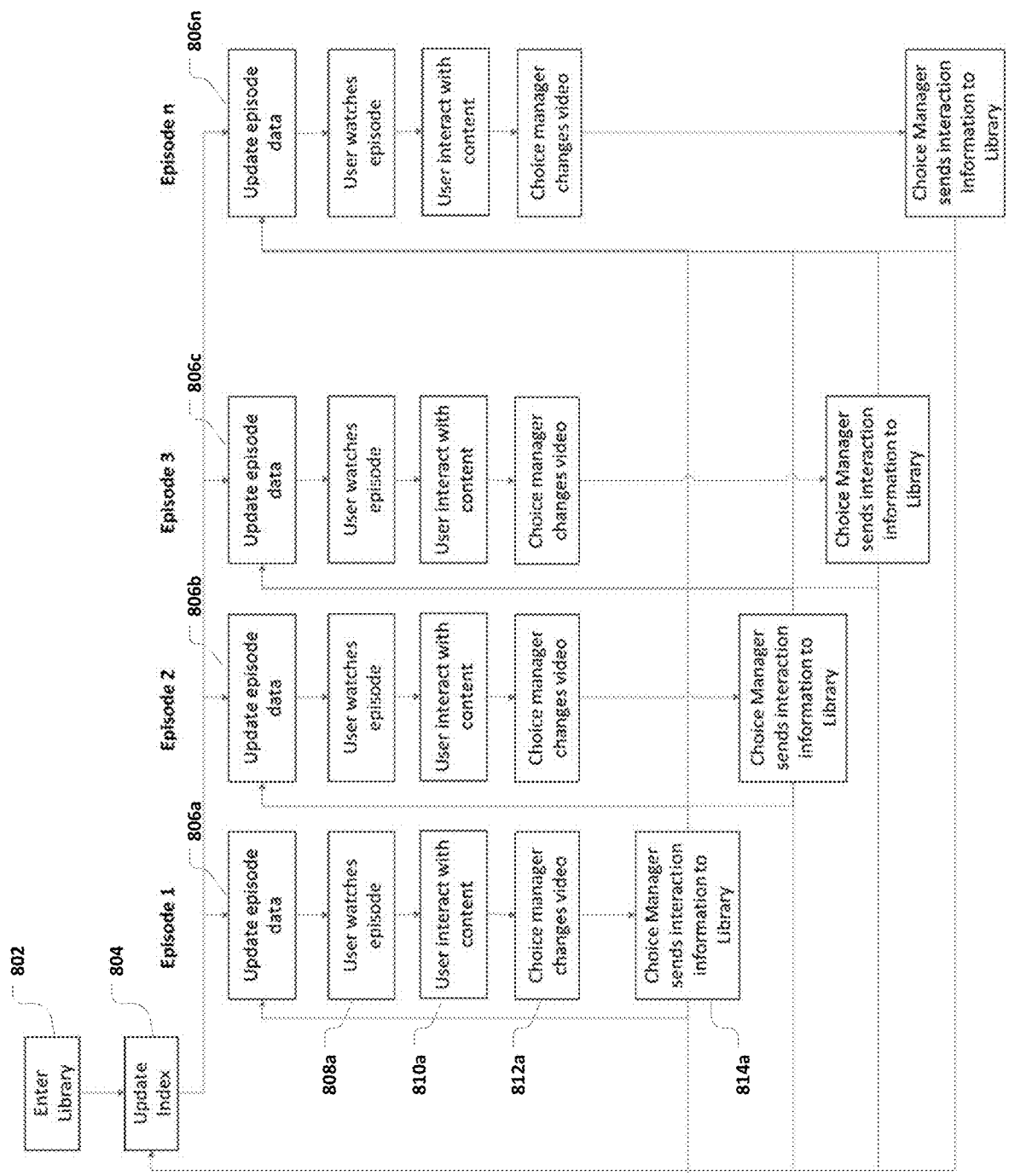
FIG. 8 depicts a method for updating video indexes and episode data in a video library interface according to an implementation.

In some implementations, interactions within one video can affect information associated with and displayed in the video library interface for that video as well as other videos in the same episodic series, or even other unrelated videos. FIG. 8 is a diagram depicting the interconnections between episodes in a series and how interactions of a user with one episode can influence an index of episodes and information associated with other episodes in the series. On entering a video library interface (802), the video index is updated and made available for display to the user (804). Updating the video index can include, for example, changing the listing of videos displayed to the user. In addition, the data associated with each episode (e.g., metadata, images, etc.) is also updated (806a, 806b, 806c, . . . , 806n). The updates to the index and episode data can occur prior to the user watching any particular episode, in which case the index and episode data can include default values, blanks, or other information. Following the viewing of an episode, the index and episode data can be dynamically updated to reflect any decisions made by the viewer during the episode. In some implementations, the index and episode data are updated in real-time as the user is watching the episode.

Referring to Episode 1 in FIG. 8, following the episode data update (806a), the user watches the interactive episode and makes decisions throughout the episode (808a and 810a). As earlier described with respect to FIG. 2, the Choice Manager 216 adapts the interactive video and causes different content to be shown to the user depending on the choices the user makes during the episode (812a). The Choice Manager 216 also sends the interaction information to the video library component (Video Data Manager 261 and List Manager 265) for updating the video library list and video information associated with the episode and, in some instances, other episodes or unrelated videos (814a). As shown in FIG. 8, a similar process occurs when the user watches any other episode in the series (Episode 2, Episode 3, . . . , Episode n).

The information associated with a video or other media content can be initialized or dynamically change in different ways among various implementations. In one implementation, the information for a particular video is an aggregation or other form of combination of some or all versions of the video that the user has seen thus far (e.g., all different paths the user has taken through an interactive video). Consider, for example, an interactive video series based on the Sherlock Holmes character, in which the user needs to discover multiple clues in order to solve a mystery; however, not all clues can be found on a single playthrough of the episode. After watching the episode multiple times making different decisions at different points in the episode, the user is able to discover the necessary clues. In correspondence with each viewing of the episode, the video metadata can update to reflect each clue the user has found. For example, after the first playthrough of the episode, the episode summary can be, "Sherlock Holmes finds a spent bullet casing in the fireplace, his first clue!" After the second playthrough, the summary can be updated to, "After a second search of the house, Sherlock locates a gun in a locked chest that appears to have been recently fired and matches the caliber of the previously found bullet casing." Similarly, video information can also be updated to reflect decisions yet to be made or paths not taken. For example, after the second playthrough, the summary can also include, "Sherlock still needs to search the house more closely to gather clues about who the killer might be."

In another implementation, the information associated with a video can be initialized or updated based on the decisions of others, instead of or in addition to those of an individual viewer. For example, the description of a video can reflect a community preference by including the most popular decisions made in an interactive video. Consider, for example, an interactive video in which a user can choose to drive a car or ride a motorcycle to a party. If the user decides to take the car but most users select the motorcycle, the video description can state, "Yoni breaks the mold and drives the Pinto to the party, but everyone else passes him on their motorcycles!" In further implementations, the information associated with a video can be initialized or updated based on known characteristics of the user (e.g., demographics, location, local weather or events, etc.).

In some implementations, the decisions the user makes in one video can also affect not only the information associated with the same video, related videos (e.g., other videos in a series), or unrelated videos, but also the content provided and/or decisions made available to the user in such video(s). For example, if the user consistently avoids violent interactions in one interactive video, the present system can remove options in further playbacks of that video that result in violent content being shown. Moreover, such options and content can be correspondingly disabled in other videos so that the user also will not be exposed to violent content when viewing those videos. This feature can also be used to dynamically adapt content for particular audiences (e.g., children).

Various examples of how the techniques described herein can be applied will now be described; however, it is to be appreciated that the uses are wide-ranging and nearly limitless. In one example, a user views a trailer video, and the video library list is dynamically populated with videos related to the trailer content. In another example, a user watches a episodic documentary about chefs from different countries, can select a different chef to watch after each episode, and the metadata associated with the episodes changes to describe the which chefs the user has already observed. In yet another example, an interactive game has multiple episodes, and each episode is unlocked only when a mystery has been solved in the preceding episode. In a further example, an interactive video series depicts the ups and downs of a relationship between two people. At each decision point in an episode, the user can decide what will happen next, and each person in the video reacts accordingly. Depending on which choices are made in episodes the user has watched, different episodes will be provided for the user to watch next. So, for example, if the user decides that the couple will ski at the end of the second episode, then the next episode made available to the user will be one in which the couple is at a ski resort.

As another example, consider an interactive series based around the lives of several characters. Each character has at least one interactive episode centered around that character, and a user viewing the episode can make decisions within the episode that affect the life of the character as well as the world in which the characters exist (and thereby affect other episodes). So, for example, if the user chooses a path in one episode that causes the character to rob a bank, the other episodes in the series are dynamically modified to include the bank robbing event, and the robbery can be reflected in the description of the episode and other episodes. Ultimately, the choices made in one interactive episode can affect the content made available or shown in other episodes, as well as affect the information shown in the video library interface that is associated with the interactive episode and/or other episodes.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. For example, one of skill in the art will appreciate that the techniques for creating seamless audio segments can be applied to creating seamless video segments and other forms of seamless media as well. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
providing an interactive video comprising a plurality of traversable video paths and video metadata including a text summary of the interactive video;
displaying, via a video information display graphic, the text summary of the interactive video to a user;
receiving, during a first playthrough of the interactive video to the user, a first interaction with the interactive video, the first interaction comprising a decision made by the user in the interactive video;
traversing a first video path in the interactive video in response to the first interaction;
upon completion of the first playthrough of the interactive video, dynamically modifying the video metadata based on the traversal of the first video path, wherein dynamically modifying the video metadata includes modifying at least a portion of the text summary of the interactive video to include a description of the first interaction; and
displaying, prior to a second playthrough of the interactive video, the modified text summary to the user via the video information display graphic to influence a second interaction during the second playthrough of the interactive video, wherein a second video path in the interactive video is traversed in response to the second interaction,
the second video path being different from the first video path.

2. The method of claim 1, wherein the video metadata includes at least one of a thumbnail image of the interactive video.

3. The method of claim 1, wherein the modified video metadata includes text and/or visual references to at least one traversable decision point in the interactive video associated with the second video path.

4. The method of claim 3, wherein the text and/or visual references correspond to clues or hints associated with the at least one traversable decision point and content included in the interactive video.

5. The method of claim 3, further comprising:
providing the second playthrough of the interactive video;
presenting the at least one traversable decision point associated with the second video path to the user;
receiving, during the second playthrough of the interactive video to the user, the second interaction with the interactive video, the second interaction comprising a decision made by the user in the interactive video; and
traversing the second video path in the interactive video in response to the second interaction.

6. The method of claim 5, further comprising:
upon completion of the second playthrough of the interactive video, dynamically modifying the video metadata based on the traversal of the second video path, wherein dynamically modifying the video metadata includes modifying at least a portion of the text summary of the interactive video to include a description of the second interaction; and
displaying, prior to a third playthrough of the interactive video, the modified text summary to the user via the video information display graphic to influence a third interaction during the third playthrough of the interactive video, wherein a third video path in the interactive video is traversed in response to the third interaction, the third video path being different from the first video path and the second video path.

7. The method of claim 1, wherein the interactive video corresponds to an episode of a series of episodes.

8. A system comprising:
at least one memory for storing computer-executable instructions; and
at least one processor for executing the instructions stored on the memory, wherein execution of the instructions programs the at least one processor to perform operations comprising:
providing an interactive video comprising a plurality of traversable video paths and video metadata including a text summary of the interactive video;
displaying, via a video information display graphic, the text summary of the interactive video to a user;
receiving, during a first playthrough of the interactive video to the user, a first interaction with the interactive video, the first interaction comprising a decision made by the user in the interactive video;
traversing a first video path in the interactive video in response to the first interaction;
upon completion of the first playthrough of the interactive video, dynamically modifying the video metadata based on the traversal of the first video path, wherein dynamically modifying the video metadata includes modifying at least a portion of the text summary of the interactive video to include a description of the first interaction; and
displaying, prior to a second playthrough of the interactive video, the modified text summary to the user via the video information display graphic to influence a second interaction during the second playthrough of the interactive video, wherein a second video path in the interactive video is traversed in response to the second interaction,
the second video path in the interactive video being different from the first video path.

9. The system of claim 8, wherein the video metadata includes at least one of a thumbnail image of the interactive video.

10. The system of claim 8, wherein the modified video metadata includes text and/or visual references to at least one traversable decision point in the interactive video associated with the second video path.

11. The system of claim 10, wherein the text and/or visual references correspond to clues or hints associated with the at least one traversable decision point and content included in the interactive video.

12. The system of claim 8, wherein execution of the instructions programs the at least one processor to perform operations comprising:
providing the second playthrough of the interactive video;
presenting the at least one traversable decision point associated with the second video path to the user;
receiving, during the second playthrough of the interactive video to the user, the second interaction with the interactive video, the second interaction comprising a decision made by the user in the interactive video; and
traversing the second video path in the interactive video in response to the second interaction.

13. The system of claim 12, wherein execution of the instructions programs the at least one processor to perform operations comprising:
upon completion of the second playthrough of the interactive video, dynamically modifying the video metadata based on the traversal of the second video path, wherein dynamically modifying the video metadata includes modifying at least a portion of the text summary of the interactive video to include a description of the second interaction; and
displaying, prior to a third playthrough of the interactive video, the modified text summary to the user via the video information display graphic to influence a third interaction during the third playthrough of the interactive video, wherein a third video path in the interactive video is traversed in response to the third interaction, the third video path being different from the first video path and the second video path.

14. The system of claim 8, wherein the interactive video corresponds to an episode of a series of episodes.

15. A computer-implemented method comprising:
providing an interactive video comprising a plurality of traversable video paths and video metadata representing a summary of the interactive video, wherein the interactive video corresponds to an episode of a series of episodes;
receiving, during a first playthrough of the interactive video to a user, a first interaction with the interactive video, the first interaction comprising a decision made by the user in the interactive video;
traversing a first video path in the interactive video in response to the first interaction;
dynamically modifying the video metadata based on the traversal of the first video path;
displaying the modified video metadata to the user to influence a second interaction during a second playthrough of the interactive video, the second interaction corresponding to a second video path in the interactive video that is different from the first video path;
providing a video library display comprising a visual depiction of information associated with the series of episodes; and
dynamically modifying the video library display based on the first interaction and/or the second interaction.

16. The method of claim 15, wherein the visual depiction of information comprises a list of the episodes, and wherein dynamically modifying the video library display includes removing one of the episodes from the list, adding an episode to the list, or changing an order of episodes in the list.

17. The method of claim 15, wherein dynamically modifying the video library display includes modifying video metadata of another episode in the series of episodes based on the first interaction and/or the second interaction.

18. A system comprising:
- at least one memory for storing computer-executable instructions; and
- at least one processor for executing the instructions stored on the memory, wherein execution of the instructions programs the at least one processor to perform operations comprising:
  - providing an interactive video comprising a plurality of traversable video paths and video metadata representing a summary of the interactive video, wherein the interactive video corresponds to an episode of a series of episodes;
  - receiving, during a first playthrough of the interactive video to a user, a first interaction with the interactive video, the first interaction comprising a decision made by the user in the interactive video;
  - traversing a first video path in the interactive video in response to the first interaction;
  - dynamically modifying the video metadata based on the traversal of the first video path;
  - displaying the modified video metadata to the user to influence a second interaction during a second playthrough of the interactive video, the second interaction corresponding to a second video path in the interactive video that is different from the first video path;
  - providing a video library display comprising a visual depiction of information associated with the series of episodes; and
  - dynamically modifying the video library display based on the first interaction and/or the second interaction.

19. The system of claim 18, wherein the visual depiction of information comprises a list of the episodes, and wherein dynamically modifying the video library display comprises removing one of the episodes from the list, adding an episode to the list, or changing an order of episodes in the list.

20. The system of claim 18, wherein dynamically modifying the video library display includes modifying video metadata of another episode in the series of episodes based on the first interaction and/or the second interaction.

* * * * *